(12) United States Patent
Williams et al.

(10) Patent No.: US 12,395,408 B1
(45) Date of Patent: Aug. 19, 2025

(54) ORCHESTRATION INTERFACE SYSTEM FOR COORDINATING COMPLEX COMPOUND DISCOVERY PIPELINES ACROSS COMPUTER NETWORKS

(71) Applicant: Recursion Pharmaceuticals, Inc., Salt Lake City, UT (US)

(72) Inventors: Anthus John Williams, Salt Lake City, UT (US); Brandon Wayne Nichols, Cottonwood Heights, UT (US); Eric Thomas Hurst, Sandy, UT (US); Justin Wade Needham, Draper, UT (US); Matthew Michael Burbidge, Herriman, UT (US); Matthew Lowry McKeithen, Salt Lake City, UT (US)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 88 days.

(21) Appl. No.: 18/524,971

(22) Filed: Nov. 30, 2023

(51) Int. Cl.
  *G06F 15/173* (2006.01)
  *H04L 41/12* (2022.01)
(52) U.S. Cl.
  CPC .................... *H04L 41/12* (2013.01)

(58) Field of Classification Search
  CPC ..................... H04L 14/06; H04L 14/0631
  See application file for complete search history.

(56) References Cited

U.S. PATENT DOCUMENTS

2022/0413948 A1\* 12/2022 Deljavan Farshi ........... G06F 11/3055

\* cited by examiner

*Primary Examiner* — Joseph R Maniwang
(74) *Attorney, Agent, or Firm* — Keller Preece PLLC

(57) ABSTRACT

The present disclosure relates to systems, non-transitory computer-readable media, and methods that implement an orchestration interface for managing and operating complex compound discovery pipelines across computer networks. Indeed, in one or more implementations, the disclosed systems manage and operate a compound discovery event publication repository for collecting and publishing events from various devices of different stages within the compound discovery pipeline according to a flexible event schema. To illustrate, utilizing the disclosed systems, individual devices can define and publish events with corresponding relationships (e.g., dependencies, parent-child relationships) for consumption and utilization by other group devices in a manner that provides flexibility to individual devices while coordinating accurately with downstream computer processes.

20 Claims, 12 Drawing Sheets

ORCHESTRATION INTERFACE SYSTEM FOR COORDINATING COMPLEX COMPOUND DISCOVERY PIPELINES ACROSS COMPUTER NETWORKS

BACKGROUND

Recent years have seen significant developments in hardware and software platforms for managing and operating complex computer-implemented pipelines. For example, conventional systems often utilize a variety of computing devices to track and/or perform various tasks within a complex operational pipeline, such as a compound discovery process. Such conventional systems, however, often result in information silos across different computing devices within the computing network, causing significant technical problems in coordinating tasks across devices and subnetworks. Accordingly, conventional systems suffer from a number of technical deficiencies, particularly with regard to operational inflexibility, inefficiency, and inaccuracy in managing and operating complex pipelines across computer networks.

SUMMARY

Embodiments of the present disclosure provide benefits and/or solve one or more of the foregoing or other problems in the art with systems, non-transitory computer-readable media, and methods for implementing an orchestration interface for managing and operating complex compound discovery pipelines across computer networks. For example, the disclosed systems implement a request interface that allows for multi-client directed, non-linear event reporting, transmission, and tracking across multiple computing devices throughout different stages of a compound discovery pipeline. In particular, in some embodiments the orchestration pipeline interface system manages a compound discovery event publication repository for publishing events from multiple devices at different stages according to a flexible event schema. Individual devices can define and publish events with corresponding relationships (e.g., dependencies, parent-child relationships) for consumption and utilization by other group devices in a manner that provides flexibility to individual devices while coordinating accurately with downstream computer processes.

Thus, over time, computing devices from different compound discovery groups and stages can build a complex request interface that dynamically grows to generate dynamic dashboards reflecting accurate, up-to-date information, regarding intricate details of various stages within the compound discovery process. Moreover, the disclosed systems can allow for coordination and automatic implementation of various steps within the compound discovery pipeline based on monitoring dynamic updates of the compound discovery event publication repository. In this manner, the disclosed systems can improve the efficiency, accuracy, and flexibility of implementing computing devices.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
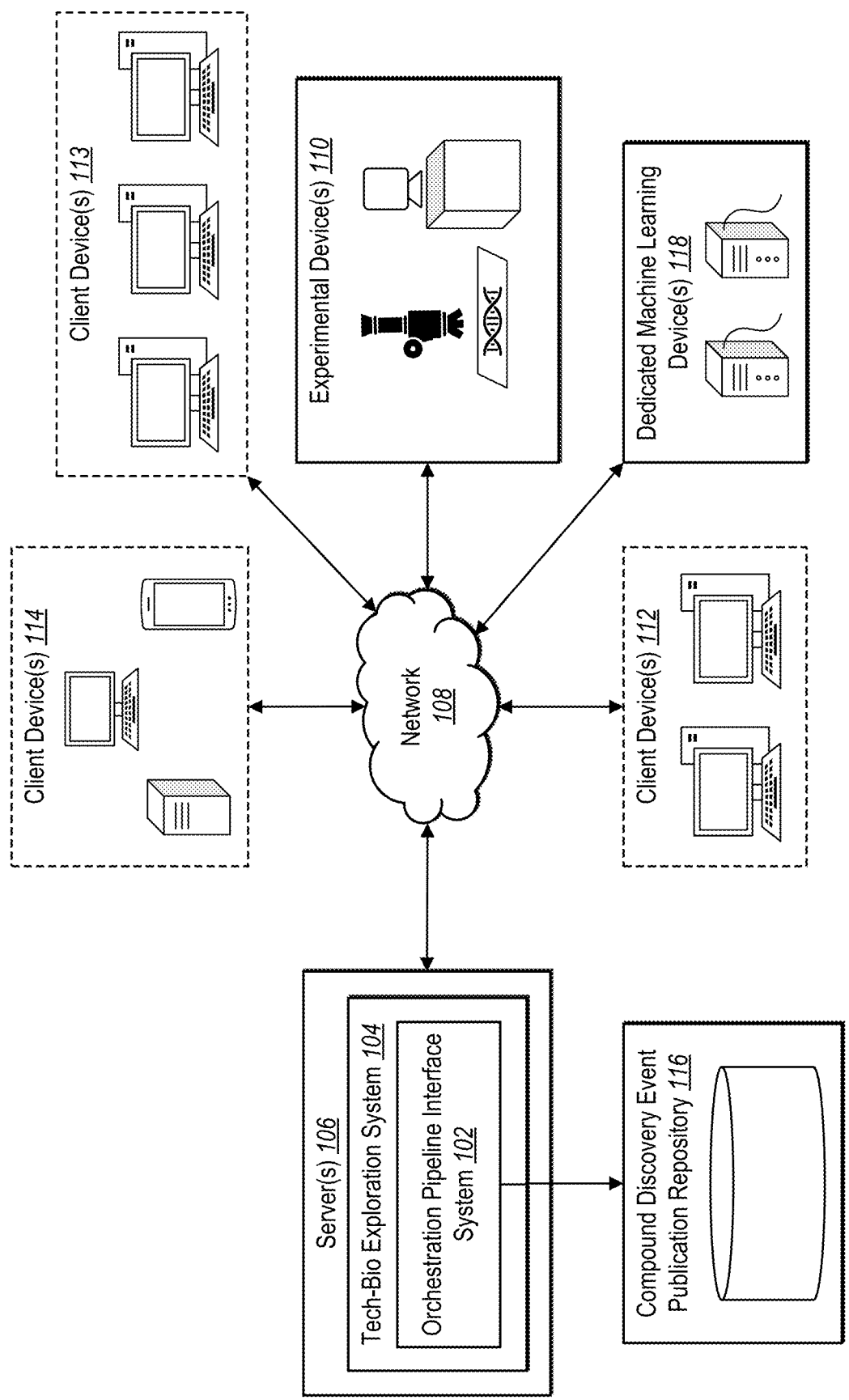
FIG. 1 illustrates a schematic diagram of a system environment in which an orchestration pipeline interface system can operate in accordance with one or more embodiments.

This disclosure describes one or more embodiments of an orchestration pipeline interface system that implements a request interface for complex compound discovery pipelines across computer networks. For example, in some embodiments the compound discovery process involves multiple groups of computing devices individually managing and tracking different portions of complex non-linear processes within a compound discovery environment. In one or more implementations, the orchestration pipeline interface system manages and operates a compound discovery event publication repository for collecting and publishing events from various devices of different stages within the compound discovery pipeline according to a flexible event schema. The orchestration pipeline interface system can utilize the compound discovery event publication repository and flexible event schema to manage these complex processes by providing a request interface that establishes dynamic and accurate reporting indications within a uniform logging interface.

Indeed, the orchestration pipeline interface system can receive client-defined event requests from a variety of computing devices from a variety of different computer subnetworks. The orchestration pipeline interface system can publish these events via the compound discovery event publication repository for consumption by other computing devices (e.g., through other individual client-defined events). The orchestration pipeline interface system can provide a variety of notifications through dynamic dashboards to provide real-time insights into the status of disparate activities across different sub-portions of the compound discovery pipeline. Moreover, over time, different subnetworks can dynamically build a complex request interface that grows and adjusts based on the particular events published to and monitored from different devices within a computer network.

To illustrate, a compound discovery pipeline can include a variety of inter-related, non-linear technological processes that need to coordinate across computer networks. For example, a first technological stage can include compound program generation, which can itself include a variety of sub-stages. For example, program generation can include a technical process for identifying target genes, machine learning analysis of the identified genes, selecting compounds based on the machine learning analysis, performing additional machine learning experimentation processes (such as phenomic digital imaging, feature extraction, and feature analysis), and technical genomic analysis to determine expressed proteins that map for a particular gene. A second technological stage can include compound lead generation that includes a variety of substages for utilizing machine learning processes and experiments to search and expand from a hit series in chemical space and test through various advanced analytical screening processes. A third technological stage can include compound and dose selection that includes a variety of sub-stages such as digital tolerability analysis, efficacy refinement, invivo digital video assay experimentation and analysis, application of data comparison models for invivomic digital videos relatively to phenotype data, and analysis of high dimensional readouts to assess disease consistency. Each sub-stage of these overall processes can themselves include sub-processes that need to be performed before other downstream processes can proceed.

Moreover, each stage and sub-stage can include prerequisite events from other stages that impact the ability to efficiently and accurately proceed. Furthermore, the specific processes and relationships between events is constantly developing and changing over time. The orchestration pipeline interface system allows for computing devices implementing each of these processes to publish, coordinate, and determine events from other processes to improve the accuracy, efficiency, and flexibility of the overall pipeline.

For example, in one or more implementations, the orchestration pipeline interface system receives compound discovery event publication transmissions from various computing devices. In particular, in some instances a compound discovery event publication transmission includes an event, a client-selected event title, an event identifier, contextual data and client-selected compound discovery prerequisite events. Specifically, prerequisite events can indicate other events required or needed for a subsequent event, which allows client devices to reference and tie subsequent events to a variety of non-linear events from other computing devices or systems. Moreover, in some embodiments, an event further includes a parent identifier (e.g., for a parent event) and child identifiers (e.g., sub-portions of a parent event). These parent-child relationships can allow for downstream computing devices to monitor progress at various stages or levels of detail. Thus, the orchestration pipeline interface system can generate a variety of inter-twining events that reflect the complexity of a variety of non-linear processes within a compound discovery pipeline. Moreover, the orchestration pipeline interface system further publishes events (as indicated in the compound discover event publication transmissions) to a compound discovery event publication repository. For instance, in some embodiments the compound discovery event publication repository includes a shared partition topic (e.g., a Kafka topic) for long-term persistence and provides an efficient way for the orchestration pipeline interface system to monitor, query and visualize the events and statuses of events (e.g., requests and corresponding runs) originating from the compound discovery process.

In one or more embodiments, the events published to the compound discovery event publication repository includes pre-fulfillment events and fulfillment events, tied together with a unique identifier. In particular, in some embodiments the pre-fulfillment events include events that occur prior to or without fulfillment of a particular action (e.g., events tied to scheduling an experiment, ready-indications, or cancellations). Further, in some embodiments, the fulfillment events include events for running, executing, or fulfilling a particular action (e.g., events indicating initiation of an experiment, successful completion, or failure). Through pre-fulfillment events and fulfillment events (tied together with a particular identifier), the orchestration pipeline interface can track progression of actions at granular levels of detail (e.g., before and after execution of any particular action or experiment) while providing flexibility for client devices to define various stages of a process in a flexible manner tailored to the particular processes at issue.

Further, in one or more embodiments, the orchestration pipeline interface system utilizes a prerequisite listener model. For example, for an event with a prerequisite of another event, the orchestration pipeline interface system via the prerequisite listener model monitors the compound discovery event publication repository to determine a status for the prerequisite. In particular, the orchestration pipeline interface system via the prerequisite listener model determines when prerequisites of the event have been fulfilled and further publishes an event indicating that the prerequisite for a specific event has been satisfied.

The orchestration pipeline interface system can also provide various notifications to computing devices (e.g., compound discovery status update notifications). For example, upon determining that prerequisites for an event have been satisfied, the orchestration pipeline interface system can publish compound discovery status update notifications to one or more client devices for executing additional actions within the compound discovery pipeline. Indeed, the orchestration pipeline interface system can automatically execute subsequent actions based on detecting that certain event prerequisites have been satisfied. Moreover, the orchestration pipeline interface system can also generate dynamic dashboards within client device user interfaces to provide up-to-date information and insights regarding various actions at different stages of the compound discovery process.

As mentioned above, conventional systems suffer from a number of technical shortcomings with regard to efficiency, flexibility, and accuracy of implementing computing devices. For example, conventional systems are inefficient in managing and operating complex compound discovery pipelines. To illustrate, in conventional systems, processes and experiments are often tracked and managed by siloed computing devices within various subnetworks/stages of an over-arching system. This leads to inefficient utilization of computer resources as client devices often have to perform complex searches/queries through multiple sub-systems to identify pertinent information regarding the status of particular events within a compound discovery process. Indeed, under many conventional systems, client devices have to spend the time and computing resources to search through multiple directories or storage resources for multiple different groups to determine whether a particular action is ready to perform. The difficulties of identifying information across these computer networks leads to even greater inefficiencies as client devices duplicate processes. For example, as clients are unable to identify previous events or actions (e.g., application of a machine learning model to particular phenomic digital images), such processes are often repeatedly requested (e.g., the machine learning model is repeatedly executed). Accordingly, conventional systems waste significant processing power and resources in coordinating across multiple sub-networks or groups.

Some conventional systems have developed that seek to address some of these inefficiencies by creating rigid, defined reporting processes. Indeed, some conventional systems generate a variety of pre-defined global (e.g., system-wide) events that client devices can track within a computing system. However, such systems suffer from significant problems with operational inflexibility. Indeed, such pre-defined event reporting systems stifle growth, development, and interactions between computing devices inasmuch as these pre-defined events fail to reflect the evolving needs of computing devices across a wide range of different groups within a compound discovery pipeline. Accordingly, conventional systems that utilize system-wide pre-defined event reporting systems are often too rigid to satisfy the constantly changing demands across various groups or sub-networks that need to coordinate in such a complex technological environment.

Similar to the operational inflexibility and inefficiency concerns, conventional systems also suffer from inaccuracies. As similarly discussed above, redundant queries, lags in system-wide dissemination of information, and the sheer number of events reported often result in inaccurate managing and operation of complex drug discovery pipelines. For instance, in conventional systems, devices of a compound discovery pipeline often fail to timely and accurately identify the status of upstream experiments and initiate the execution of downstream operations.

As suggested by the foregoing discussion, the orchestration pipeline interface system provides a variety of technical advantages relative to conventional systems. For example, the orchestration pipeline interface system can improve efficiency relative to conventional systems. For example, the orchestration pipeline interface system can publish client-defined events to the compound discovery event publication repository, monitor the repository to extract various event identifiers and client-selected compound discovery prerequisite events, and utilize other client-device events to transmit status update notifications to various computing devices within a computer network. In doing so, the orchestration pipeline interface system creates complex, client-generated information connections across various devices of a compound discovery pipeline that allows individual client devices, groups, and stages to access pertinent digital information. Indeed, through a few user interactions selecting particular prerequisite events, a client device can establish a schedule event that triggers a future notification for scheduling a machine learning experiment upon completion of the necessary prerequisite events within the compound discovery pipeline. Moreover, the orchestration pipeline interface system can generate improved user interfaces (e.g., cross-stage dashboards) to further reduce needed user interactions and interfaces. Thus, the orchestration pipeline interface system reduces the time, computing resources, and user interface interactions utilized by conventional systems to search a variety of other sub-systems for pertinent information before initiating downstream computer processes.

Moreover, in some embodiments the orchestration pipeline interface system further improves inefficiencies by reducing or eliminating duplicate queries, experiments, and other processes. For example, the orchestration pipeline interface system can implement a prerequisite listener model to monitor the compound discovery event publication repository to compare a prerequisite event with events published to the repository. Doing so can reduce or eliminate redundant queries and repeated execution of machine learning driven experiments, such as capturing phenomic digital images in generating phenomic image embeddings.

In some implementations, the orchestration pipeline interface system also improves operational flexibility relative to conventional systems. Indeed, in contrast to conventional systems that utilize global, pre-defined events, the orchestration pipeline interface system allows client devices to define events, prerequisites, and other event relationships utilizing an event schema. In this manner, the orchestration pipeline interface system allows client devices, groups, and sub-networks to build a request interface that flexibly adapts to the individual and evolving needs of each group or sub-network. In particular, in some embodiments the orchestration pipeline interface system allows for individual computing devices to configure client-selected compound discovery prerequisite events for a specific event and publish the event to the compound discovery event publication repository. In some such embodiments, publication to the compound discovery event publication repository allows for the orchestration pipeline interface system to monitor and transmit notifications regarding a status update to one or more computing devices. Accordingly, in context of the drug discovery process, the orchestration pipeline interface system enhances the flexibility to adapt to receiving numerous events and assisting users in staying up to date on the status of various processes/experiments.

Additionally, in some embodiments the orchestration pipeline interface system allows client devices to define and utilizes parent-child event relationships. This approach improves efficiency and flexibility by providing client devices with options to determine the level of specificity or granularity needed for compound discovery status update notifications. Indeed, the orchestration pipeline interface system can allow client devices to define and coordinate utilizing parent events such that all the child events reflect the identifier of its parent event. In this manner, downstream computing devices can generate events relying on the parent event and/or the child event. In this manner, downstream computing devices can receive compound discovery status update notifications for all child events or reduce notifications (and simplify user interface dashboards) by receiving compound discovery status update notifications for a parent event.

In addition to the operational flexibility and efficiency improvements, in one or more embodiments, the orchestration pipeline interface system further improves technical accuracy. For example, similar to the above, the orchestration pipeline interface system publishes and monitors events on the compound discovery event publication repository and provides accurate compound discovery status update notifications (e.g., through compound discovery dashboards within user interfaces of client devices). Thus, in some embodiments the orchestration pipeline interface system accurately manages a large number of events that come from a drug discovery pipeline to accurately orchestrate the complex coordination between various computing devices involved in the compound discovery process.

Additional detail regarding an orchestration pipeline interface system 102 will now be provided with reference to the figures. In particular, FIG. 1 illustrates a schematic diagram of a system environment in which the orchestration pipeline interface system 102 can operate in accordance with one or more embodiments.

As shown in FIG. 1, the environment includes server(s) 106 (which includes a tech-bio exploration system 104 and the orchestration pipeline interface system 102), a compound discovery event publication repository 116, a network 108, a dedicated machine learning device(s) 118, and client device(s) 112, 113, and 114. As further illustrated in FIG. 1, the various computing devices within the environment can communicate via the network 108. Although FIG. 1 illustrates the orchestration pipeline interface system 102 being implemented by a particular component and/or device within the environment, the orchestration pipeline interface system 102 can be implemented, in whole or in part, by other computing devices and/or components in the environment (e.g., the additional device(s) 114). Additional description regarding the illustrated computing devices is provided with respect to FIG. 12 below.

As shown in FIG. 1, the server(s) 106 (e.g., one or more local servers operated by a particular entity) can include the tech-bio exploration system 104. In some embodiments, the tech-bio exploration system 104 can determine, store, generate, and/or display tech-bio information including maps of biology, experiments from various sources, and/or machine learning tech-bio predictions. For instance, the tech-bio exploration system 104 can analyze data signals corresponding to various treatments or interventions (e.g., compounds or biologics) and the corresponding relationships in genetics, proteomics, phenomics (i.e., cellular phenotypes), and invivomics (e.g., expressions or results within a living animal). Moreover, the tech-bio exploration system 104 provides an environment for operating, executing, and managing complex drug discovery pipelines.

For instance, the tech-bio exploration system 104 can generate and access experimental results corresponding to gene sequences, protein shapes/folding, protein/compound interactions, phenotypes resulting from various interventions or perturbations (e.g., gene knockout sequences or compound treatments), and/or invivo experimentation on various treatments in living animals. By analyzing these signals (e.g., utilizing various machine learning models), the tech-bio exploration system 104 can generate or determine a variety of predictions and inter-relationships for improving treatments/interventions.

To illustrate, the tech-bio exploration system 104 can generate maps of biology indicating biological inter-relationships or similarities between these various input signals to discover potential new treatments as part of the complex compound discovery process. For example, the tech-bio exploration system 104 can utilize machine learning and/or maps of biology to identify a similarity between a first gene associated with disease treatment and a second gene previously unassociated with the disease based on a similarity in resulting phenotypes from gene knockout experiments. The tech-bio exploration system 104 can then identify new treatments based on the gene similarity (e.g., by targeting compounds the impact the second gene). Similarly, the tech-bio exploration system 104 can analyze signals from a variety of sources (e.g., protein interactions, or invivo experiments) to predict efficacious treatments based on various levels of biological data.

The tech-bio exploration system 104 can generate GUIs comprising dynamic user interface elements to convey tech-bio information and receive user input for intelligently exploring tech-bio information. Indeed, as mentioned above, the tech-bio exploration system 104 can generate GUIs displaying different maps of biology that intuitively and efficiently express complex interactions between different biological systems for identifying improved treatment solutions. Furthermore, the tech-bio exploration system 104 can also electronically communicate tech-bio information between various computing devices.

As shown in FIG. 1, the tech-bio exploration system 104 can include a system that facilitates various models or algorithms for generating maps of biology (e.g., maps or visualizations illustrating similarities or relationships between genes, proteins, diseases, compounds, and/or treatments) and discovering new treatment options over one or more networks. For example, the tech-bio exploration system 104 collects, manages, and transmits data across a variety of different entities, accounts, and devices. In some cases, the tech-bio exploration system 104 is a network system that facilitates access to (and analysis of) tech-bio information within a centralized operating system. Indeed, the tech-bio exploration system 104 can link data from different network-based research institutions to generate and analyze maps of biology.

As shown in FIG. 1, the tech-bio exploration system 104 can include a system that comprises the orchestration pipeline interface system 102 that generates, stores, manages, transmits data pertaining to complex drug discovery pipelines. For example, in context of the above description for the tech-bio exploration system 104, in some embodiments the tech-bio exploration system 104 further utilizes the orchestration pipeline interface system 102 to enhance the coordination between various groups involved in the drug discovery process. For instance, the orchestration pipeline interface system 102 works in tandem with the tech-bio exploration system to publish events to the compound discovery event publication repository 116 and monitor it for further transmitting notifications to various devices.

As also illustrated in FIG. 1, the environment includes the client device(s) 112, 113, and 114. As mentioned above, the client device(s) 112, the client device(s) 113, and the client device(s) 114 can belong to different groups or be devoted to different operational stages within a compound discovery process. Thus, for example, the client device(s) 112 can coordinate/manage a first stage of a compound discovery pipeline, the client device(s) 113 can coordinate/manage a second stage of a compound discovery pipeline, and the client device(s) 114 can coordinate/manage a third stage of a compound discovery pipeline. Although illustrated as separate groups, individual client devices can also overlap and perform different processes within different stages of a drug discovery pipeline. Thus, for example, a first client device may be involved in directing machine learning algorithms across multiple different stages of a drug discovery pipeline. However, as illustrated, client devices are often siloed into particular functions or stages that make it technically difficult to determine what other actions have occurred (e.g., what processes other client devices have performed for other stages of the compound discovery pipeline).

To illustrate, the client device(s) 112 can include computing devices that implement or manage a compound program generation stage of a compound discovery process. Similarly, the client device(s) 113 can include computing devices that implement or manage a compound lead generation stage and the client device(s) 114 can include computing devices that implement or manage a compound/dose selection stage. For example, the orchestration pipeline interface system 102 can receive one or more events from the client device(s) 114 to publish to the compound discovery event publication repository 116. For instance, the orchestration pipeline interface system 102 can receive events from the client device(s) 114 that include prerequisites referencing events published from the client device(s) 112. In response to the prerequisites being satisfied, the client device(s) 114 can automatically perform analysis on experiments contingent on the prerequisites. Similar to the above, the analytical device(s) 112 can also include a client application with instructions that (upon execution) cause the analytical device(s) 112 to perform various actions. Accordingly, a user can interact with the client application of the analytical device(s) 112 to perform analyses, access results or other actions related to the analytical device(s) 112.

As shown in FIG. 1, the environment also includes additional device(s) 114. For example, the orchestration pipeline interface system 102 can utilize the additional device(s) 114 to further operate and manage the completion of complex drug discovery pipelines. For instance, the additional device(s) 114 include the types of experimental device(s) 110 and analytical device(s) discussed above. Further, in some instances, the additional device(s) 114 also include the computing devices discussed below in FIG. 12. Moreover, in some instances the orchestration pipeline interface system 102 receives event transmissions from the additional device(s) 114, publishes the event transmissions to the compound discovery event publication repository 116 and further transmits notifications back to the additional device(s) 114.

Furthermore, in one or more implementations, the client device(s) 112, 113, and 114 include a client application. The client application can include instructions that (upon execution) cause the client device(s) 112, 113, and 114 to perform various actions. For example, a user of a user account can interact with the client application on the client device(s) 112, 113, and 114 to execute experiments or other multi-faceted processes and to further access tech-bio information, initiate a request for a publication of an event transmission, and/or query various events in the compound discovery event publication repository 116. For instance, in some embodiments the orchestration pipeline interface system 102 monitors the compound discovery event publication repository 116, and in response to determining satisfaction of a prerequisite, transmits a status update notification to the client device(s) 112, 113, and 114. In some instances, the transmittal of the status update notification to the client device(s) 112, 113, and/or 114 causes the client device(s) 112, 113, and/or 114 to execute an action (e.g., an experiment or a multi-faceted process).

As illustrated in FIG. 1, the environment also includes experimental device(s) 110. For example, the tech-bio exploration system 104 can interact with the experimental device(s) 110 that include intelligent robotic devices and camera devices for generating and capturing digital images of cellular phenotypes resulting from different perturbations (e.g., genetic knockouts or compound treatments of stem cells). Similarly, the experimental device(s) 110 can include camera devices and/or other sensors (e.g., heat or motion sensors) capturing real-time information from animals as part of invivo experimentation. The tech-bio exploration system 104 can also interact with a variety of other experimental device(s) 100 such as devices for determining, generating, or extracting gene sequences or protein information. For example, the experimental device(s) 110 may include computing devices linked to biosensorselectrophysiological platforms, x-ray crystallography machines, liquid chromatography mass spectrometry systems, nuclear magnetic resonance spectrometers, mass spectrometers. In some implementations, the orchestration pipeline interface system 102 manages, schedules, executes, and tracks operation of the experimental device(s) 110 based on other events within the environment.

As further shown in FIG. 1, the environment includes the network 108. As mentioned above, the network 108 can enable communication between components of the environment. In one or more embodiments, the network 108 may include a suitable network and may communicate using a various number of communication platforms and technologies suitable for transmitting data and/or communication signals, examples of which are described with reference to FIG. 12. Furthermore, although FIG. 1 illustrates computing devices communicating via the network 108, the various components of the environment can communicate and/or interact via other methods (e.g., communicate directly).

In addition, the environment can also include dedicated machine learning device(s) 118. For example, the dedicated machine learning device(s) 118 can include computing devices or virtual machines dedicated to training or implementing large-scale machine learning models. For example, the dedicated machine learning device(s) 118 can generate machine learning predictions and/or embeddings based on digital biological data (e.g., digital images of phenotypes resulting from different perturbations or compound-protein interactions from compound features). In some implementations, the orchestration pipeline interface system 102 manages, schedules, executes, and/or tracks operation of the dedicated machine learning device(s) 118 based on other events within the environment.

As mentioned above, the orchestration pipeline interface system 102 operates and manages the transmission of events across computer networks utilizing a compound discovery event publication repository. For example, FIG. 2 shows an overview of the orchestration pipeline interface system 102 generating a status update notification to provide to one or more computing devices in accordance with one or more embodiments.

Figure 2:
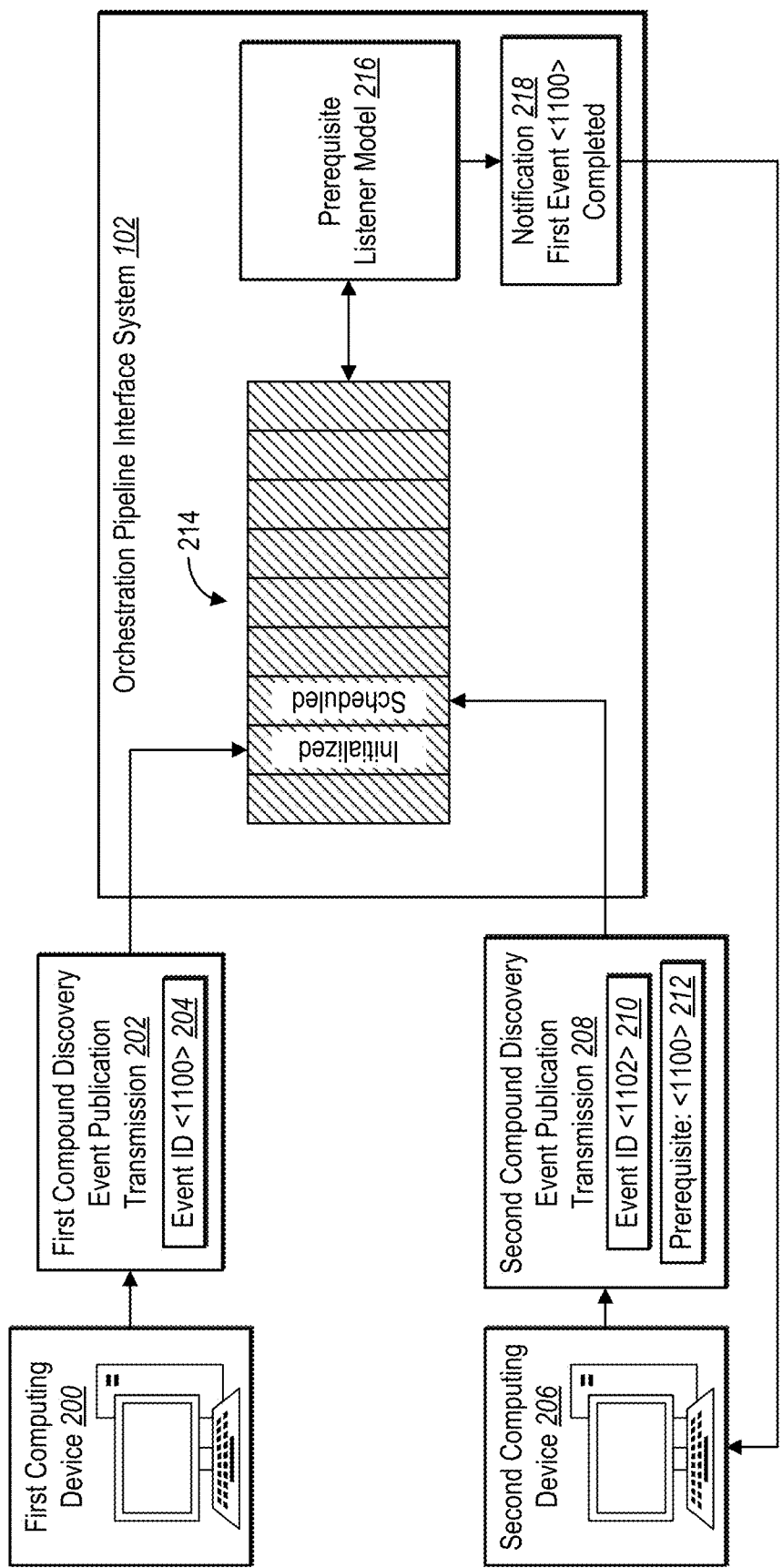
FIG. 2 illustrates an overview figure of the orchestration pipeline interface system generating a notification to provide to one or more computing devices in accordance with one or more embodiments.

As illustrated, FIG. 2 shows a first computing device 200 and a second computing device 206. Moreover, FIG. 2 shows the orchestration pipeline interface system 102 receiving a first compound discovery event publication transmission 202 from the first computing device 200 and a second compound discovery event publication transmission 208 from the second computing device 206. As mentioned above, the orchestration pipeline interface system 102 can utilize a flexible event schema that allows client devices to dynamically define events to publish (and inter-relationships between those events). As shown in FIG. 2, the first compound discovery event publication transmission contains an event identifier 204 (e.g., "<1100>"]. Moreover, as also shown, the second compound discovery event publication transmission 208 includes an event identifier 210 of <1102> and a prerequisite 212 that includes the event identifier <1100> (e.g., the same as the event identifier 204).

The first computing device 200 can select and define parameters of the first compound discovery event publication transmission 204 (such as a title, context, etc.). Similarly, the second computing device 200 can select and define parameters of the first compound discovery event publication transmission 208 (such as title and the prerequisite 212). This for example, the second computing device 200 can determine the particular client-defined prerequisite events (e.g., events published from the first computing device 200) that will trigger future actions corresponding to the second computing device 206. Thus, the orchestration pipeline interface system 102 allows both client devices to determine the particular events and inter-relationships between events to coordinate compound discovery processes across computer networks.

As used herein, the term "compound discovery" refers to a process of identifying and selecting potential chemical compounds or molecules (e.g., for development into new or enhanced treatments). As mentioned above, compound discovery can include a variety of inter-connected processes and sub-processes such as gene/compound inference, compound program generation, compound lead generation, compound/dose selection, and/or regulatory experimentation and approval processes. In some implementations, compound discovery involves a variety of machine learning processes. For example, orchestration pipeline interface system 102 performs cell perturbations and captures phenomic digital images of the perturbed cells. The orchestration pipeline interface system 102 then utilizes a machine learning model to generate embeddings from the phenomic digital images and compares the embeddings to identify inter-relationships between genes, proteins, compounds, and/or diseases. The orchestration pipeline interface system 102 performs additional experiments and analysis using a variety of different models to filter, explore, test, and select compounds based on these inter-relationships. Additional detail regarding example processes in compound discovery are provided below (e.g., in relation to FIG. 8).

In context of the above, the compound discovery event publication transmission includes a transmission of information from a computing device including information regarding an event corresponding to compound discovery. For example, a compound discovery event publication transmission can include information regarding an event related to compound discovery with an event title, event identifier, context, prerequisite events, and other components discussed below. For instance, the compound discovery event publication transmission includes a transmission to the orchestration pipeline interface system 102 regarding a status of a specific compound discovery event. Moreover, the orchestration pipeline interface system 102 receives the compound discovery event publication transmission for publication to a compound discovery event publication repository 214.

As just mentioned, the orchestration pipeline interface system 102 receives an indication from the computing devices to publish the first compound discovery event publication transmission 202 and the second compound discovery event publication transmission 208. In one or more embodiments, the orchestration pipeline interface system 102 publishes events from compound discovery event publication transmissions to the compound discovery event publication repository 214. Further, the orchestration pipeline interface system 102 can implement monitoring and logging models to track updates and interactions as different events are published.

In one or more embodiments, the compound discovery event publication repository 214 includes a common repository (e.g., to broadcast the status of a compound discovery event publication). Further, in some embodiments the compound discovery event publication repository 214 includes a partitioned database (e.g., a Kafka topic) where the orchestration pipeline interface system 102 publishes data to the partitioned database and the published data is consumed by various computing devices of a shared networking environment.

As shown in FIG. 2, the orchestration pipeline interface system 102 utilizes a prerequisite listener model 216 to monitor the compound discovery event publication repository 214. As shown, the orchestration pipeline interface system 102 receives the second compound discovery event publication transmission 208 with the prerequisite 212. In some embodiments the orchestration pipeline interface system 102 utilizes a prerequisite listener model 216 to monitor and detect additional updates to the compound discovery event publication repository 214.

For instance, the orchestration pipeline interface system 102 handles the publishing of various compound discovery event publications to the compound discovery event publication repository 214. Further, the orchestration pipeline interface system 102 further utilizes the prerequisite listener model 216 to detect subsequent event updates (e.g., the completion of specific events that satisfy prerequisites for another event). Additional details regarding the prerequisite listener model 216 is given below in the description of FIG. 8.

As shown in FIG. 2, the orchestration pipeline interface system 102 monitors the compound discovery event publication repository 214 and determines a completion of an event that satisfies a prerequisite. In particular, the orchestration pipeline interface system 102 utilizes the prerequisite listener model 216 to determine that the event identifier 204 of the first compound discovery event publication transmission 202 satisfies the prerequisite 212. In response, the orchestration pipeline interface system 102 generates a notification 218 regarding a status update that the first event <1100> is completed.

In one or more embodiments, the orchestration pipeline interface system 102 transmits the notification 218 (e.g., a compound discovery status update notification) to the second computing device. In particular, the orchestration pipeline interface system 102 transmits the notification 218 to a notification dashboard of the second computing device 206. In addition, in some embodiments the orchestration pipeline interface system 102 further transmits the notification 218 to additional computing devices. In some embodiments, the orchestration pipeline interface system 102 transmitting the notification 218 automatically triggers downstream compound discovery tasks for the second computing device 206 to perform.

As mentioned above, the orchestration pipeline interface system 102 utilizes an event schema that allows client devices to flexibly define events and determine relationships between events. For example, FIG. 3 illustrates a diagram of a sample event schema including optional schemas for parent/child events, pre-fulfillment events, and/or fulfillment events in accordance with one or more embodiments.

Figure 3:
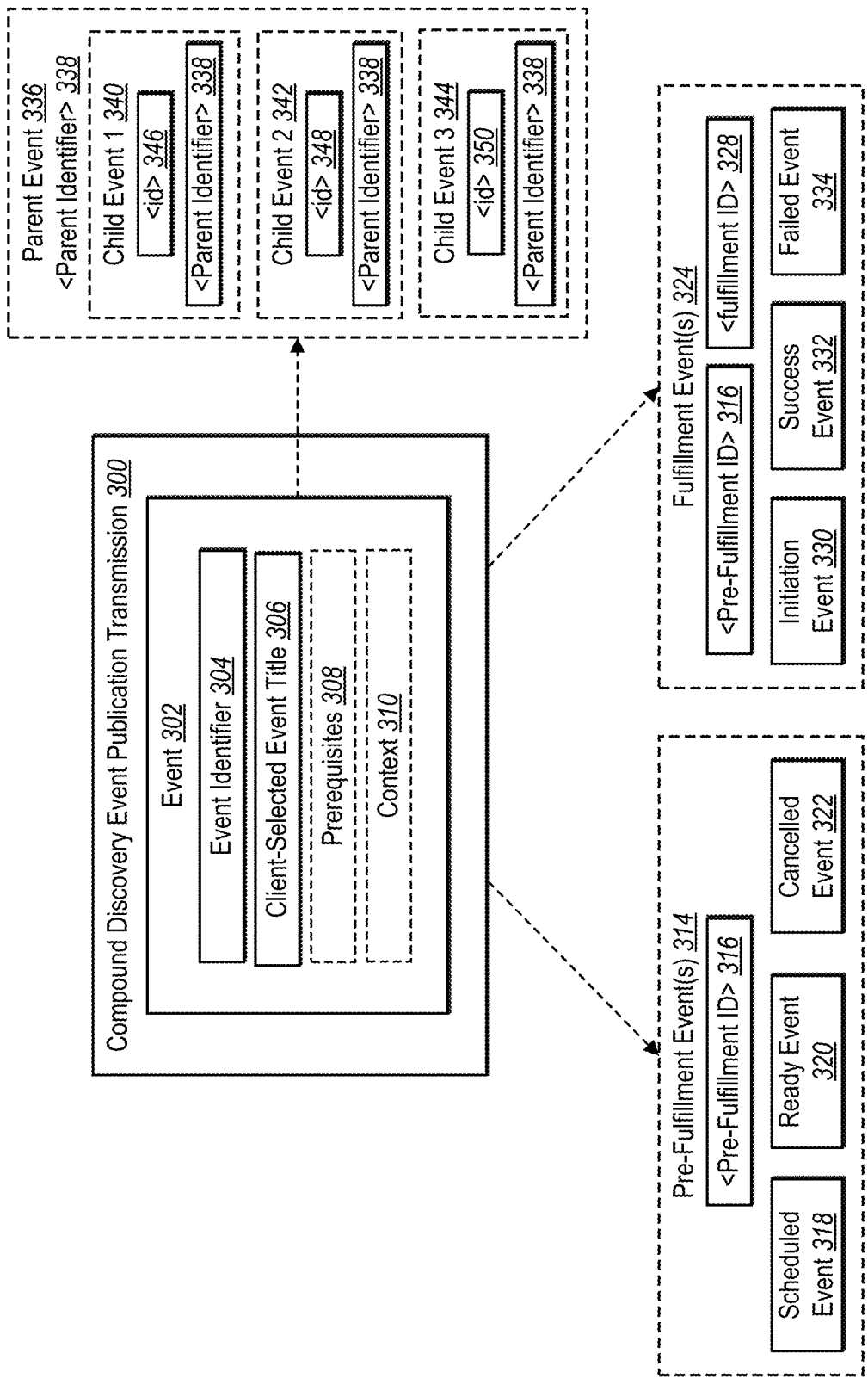
FIG. 3 illustrates an example diagram of a compound discovery event publication transmission that includes an event and in some instances pre-fulfillment event(s) and/or fulfillment event(s) in accordance with one or more embodiments.

As shown in FIG. 3, the compound discovery event publication transmission 300 includes an event 302. The event 302 can include one of a variety of different events corresponding to actions within a compound discovery process. As mentioned above, the particular types of events can dynamically change to accommodate the flexible needs of particular client devices. Thus, for example, the event 302 can include scheduling execution of a particular machine learning model. Execution of the machine learning model may depend on execution of perturbation experiments on a various wells and capturing a variety of phenomic digital images of cells resulting from the perturbations. Over time, the particular machine learning model, perturbations, and experiments may change. A client device can populate the schema of the event 302 to flexibly accommodate these changes.

FIG. 3 shows an event identifier 304 as part of the event 302. In one or more embodiments, the orchestration pipeline interface system 102 generates, identifies, or receives the event identifier 304 as a unique identifier (e.g., does not overlap with other compound discovery events). Moreover, in some embodiments, the orchestration pipeline interface system 102 ties other publication transmission for a specific event to the event identifier 304.

As shown in FIG. 3, the event 302 also includes a client-selected event title 306. In one or more embodiments, the orchestration pipeline interface system 102 provides an option to a user of a computing device to indicate the client-selected event title 306. For instance, in starting the compound discovery process, a user of a computing device configures and transmits the compound discovery event publication transmission. As part of the configuration process, the orchestration pipeline interface system 102 provides an option to name the specific event.

Furthermore, as shown, the event 302 in some embodiments also includes contextual data 310. In one or more embodiments, the orchestration pipeline interface system 102 further receives the contextual data 310 as part of the compound discovery event publication transmission 300. For instance, the contextual data 310 includes information related to the transmission such as a storage location for results of the compound discovery event. Further, the contextual data 310 includes relevant files for the compound discovery event, notes detailing progress for a compound discovery event, and other contextual information. Moreover, in some embodiments, the contextual data 310 includes a map, guide, or pointer to additional information. For instance, contextual data 310 can includes instruction for a downstream service (e.g., computer code, an application programing interface function call, etc.) to access the results of a completed event.

As also shown, in some embodiments the event 302 includes prerequisite(s) 308. In one or more embodiments, the orchestration pipeline interface system 102 further receives as part of the compound discovery event publication transmission a client-selected compound discovery prerequisite event(s). A client-selected compound discovery prerequisite event includes an event identified by a client that is a condition, criteria, or qualification for another event. For instance, the orchestration pipeline interface system 102 provides an option for a user of a computing device to indicate that a compound discovery event is dependent upon another compound discovery event. Accordingly, the prerequisite(s) 308 includes a condition, requirement, or qualification prior to the current compound discovery event.

In one or more embodiments, the prerequisite(s) 308 include the orchestration pipeline interface system 102 providing a configuration option to input the prerequisite(s) 312 as an array (e.g., array[str]). For instance, the array can include [<1100>, <1109>, <1110>] which indicates that the prerequisite(s) 312 for the event 302 includes the events <1100>, <1109>, <1110>. In some instances, the event identifiers include letters, numbers, and/or symbols. Accordingly, the prerequisite(s) 312 can include a list of fulfillment identifiers (e.g., run identifiers) and/or a list of pre-fulfillment identifiers (e.g., request identifiers).

In some embodiments, the compound discovery event publication transmission 300 includes the event 302 and further includes a timestamp. In some embodiments the timestamp includes a sequence of characters or encoded information that represents a specific point in time (e.g., in a human readable format). For instance, the timestamp includes a specific time at which the orchestration pipeline interface system 102 published the compound discovery event publication transmission 300 to the compound discovery event publication repository. Further, in some instances the timestamp includes a specific point in time that includes milliseconds.

As mentioned above, in some embodiments the event 302 can include a pre-fulfillment event 314 and/or a fulfillment event 324. For example, the pre-fulfillment event(s) 314 includes events that occur prior to execution or fulfillment of an action. For instance, the pre-fulfillment event(s) 314 includes scheduled events 318 (e.g., an event for scheduling an action, such as scheduling an experiment), ready events 320 (e.g., an event indicating that an action, such as an experiment, is ready to perform), and cancelled events 322 (e.g., an event indication that an action, such as a machine learning model analysis, was cancelled).

In one or more embodiments, a pre-fulfillment scheduled event includes an event for scheduling a subsequent compound discovery action. For instance, as mentioned above, a client device may need to execute a machine learning model and reserve time for a dedicated machine learning model device but cannot schedule execution of the machine learning model until all phenomic digital images are available. The client device can initiate a pre-fulfilment scheduled event (i.e., for scheduling the machine learning model) once the phenomic digital image prerequisites are complete. Further, in one or more embodiments, a pre-fulfillment ready event includes an indication of a compound discovery action being ready for execution. Thus, a client device executing a particular machine learning model can publish a pre-fulfillment ready event when all available data is ready, and the machine learning model is ready to execute. Moreover, in one or more embodiments, a pre-fulfillment cancelled event includes an indication that the compound discovery action will not take place (e.g., execution of the machine learning model was cancelled). As shown, whether pre-fulfillment event(s) 314 are scheduled 318, ready 320, or cancelled 322 events, it includes a pre-fulfillment identifier 316 (e.g., <pre-fulfillment ID>).

As mentioned above, in some implementations the event 302 can include the fulfillment event(s) 324. For example, the fulfillment event(s) 324 include events relating to fulfillment, execution of an action (e.g., initiation or completing an action within a compound discovery pipeline). For example, the fulfillment event(s) 324 includes initiation events 330 (e.g., an event for initiating an action, such as executing a machine learning model), success events 332 (e.g., an event indicating the action was successfully fulfilled), and failed events 334 (e.g., an event indicating that the action failed, such as a machine learning model failing to execute or converge).

In one or more embodiments a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

As further shown, the fulfillment event(s) 324 further includes both the pre-fulfillment identifier 316 and a fulfillment identifier 328. In some embodiments, the fulfillment event(s) 324 includes both the pre-fulfillment identifier 316 and a fulfillment identifier 328 (e.g., to tie the events together).

To illustrate, the event 302 can include a type of REQUEST_SCHEDULED, REQUEST_READY, REQUEST_CANCELED, RUN_STARTED, RUN_SUCCEEDED, RUN_FAILED, and RUN_CANCELED followed by a unique number identifier (e.g., REQUEST_SCHEDULED_<uuid>). Moreover, in some embodiments, if the event 302 includes a type of RUN_STARTED, the orchestration pipeline interface system 102 monitors the compound discovery event publication repository 116 to identify a subsequent event type of RUN_SUCCEEDED, RUN_FAILED, or RUN_CANCELED (e.g., identifies the fulfillment event(s) 324 that occurs subsequent to the initiation 330).

FIG. 3 further shows that the event 302 can include a parent event 336 and corresponding child events 340, 342, 344. In one or more embodiments, the compound discovery event includes the parent event 336 and one or more child events. For example, the parent event 336 encapsulates one or more child events and acts as the meta event for all of its child events. Thus, upon completion of the child events within the parent event 336, the parent event 336 is also completed.

Moreover, as shown in FIG. 3, the parent event 336 further includes a parent identifier 338. In particular, the parent identifier 338 includes a unique identifier for the parent event 336. In some instances, the parent identifier 338 acts as the event identifier 304 (e.g., subsequent fulfillment event(s) would tie back to the parent identifier 338).

As further shown in FIG. 3, the parent event 336, includes a first child event 340, a second child event 342, and a third child event 344. For instance, a child event includes a sub-event of the parent event 336. Thus, the parent event 336 can be partially complete when some of the child events are completed. Furthermore, as shown, the first child event 340 includes a first child identifier 346, the second child event 342 includes a second child identifier 348, and the third child event includes a third child identifier 350. Moreover, as shown, each of the child events further includes the parent identifier 338 to tie the child events back to the parent event 336.

To illustrate, if the event 302 includes the parent event 336 with the parent identifier 338 of <1100>, the first child event 340 can include the first child identifier 346 of <1102> and the parent identifier 338 of <1100>. Accordingly, if the orchestration pipeline interface system 102 receives the compound discovery event publication transmission 300 of scheduled 318 (e.g., the pre-fulfillment event(s) 314) for the first child event 340, the first child identifier 346 of <1102> and the parent identifier 338 of <1100> acts as the pre-fulfillment identifier 316.

For instance, the pre-fulfillment identifier 316 in this instance could include ARR_1100_1102_SCHEDULED (e.g., for a pre-fulfillment schedule event). The orchestration pipeline interface system 102 could then identify/receive a fulfillment event subsequent to the pre-fulfillment schedule event. Utilizing the event schema illustrated in FIG. 3, this fulfillment event could include a fulfillment identifier of ARR_1100_1104_STARTED and the pre-fulfillment identifier 316 of ARR_1100_1102_SCHEDULED. Although FIG. 3 illustrates a particular example event schema, the orchestration pipeline interface system 102 can utilize a variety of different fields (e.g., more or less than shown).

Figure 4:
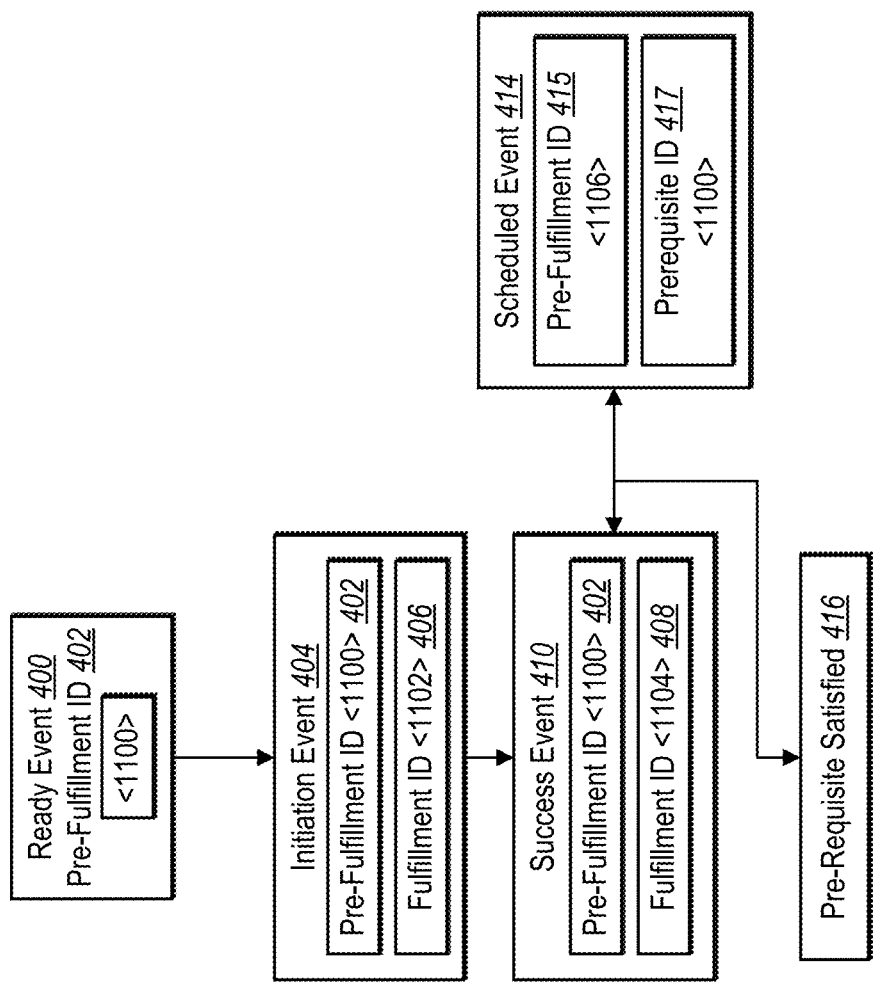
FIG. 4 illustrates an example embodiment of a pre-fulfillment event and several fulfillment events for which the orchestration pipeline interface system utilizes to determine a prerequisite is satisfied in accordance with one or more embodiments.

As mentioned, the orchestration pipeline interface system 102 can utilize combination of events to track and publish updates within a compound discovery pipeline across computer networks. For example, FIG. 4 illustrates the orchestration pipeline interface system 102 utilizing a pre-fulfillment event and subsequent fulfillment events to determine satisfaction of a prerequisite in accordance with one or more embodiments. For example, FIG. 4 shows a series of events that the orchestration pipeline interface system 102 publishes to the compound discovery event publication repository. For instance, FIG. 4 shows a pre-fulfillment event (i.e., a ready event 400) with a pre-fulfillment identifier 402 of <1100> published to the compound discovery event publication repository.

Further, FIG. 4 shows that subsequent to the ready event 400, the orchestration pipeline interface system 102 publishes a fulfillment event (i.e., an initiation event 404). In particular, the initiation event 404 includes the pre-fulfillment identifier 402 of <1100> (e.g., the initiation event 404 status is tied to the ready event 400). Moreover, the initiation event 404 further includes a fulfillment identifier 406 of <1102>.

Moreover, FIG. 4 shows subsequent to the initiation event 404, the orchestration pipeline interface system 102 publishes a fulfillment event (i.e., a success event 410) to the compound discovery event publication repository. For instance, as shown, the success event 410 also includes the pre-fulfillment identifier 402 of <1100> and further includes a fulfillment identifier 408 of <1104>.

As mentioned above, the orchestration pipeline interface system 102 monitors the compound discovery event publication repository. In some embodiments the orchestration pipeline interface system 102 identifies another event (i.e., scheduled event 414) with a pre-fulfillment identifier 415 of <1106>. Furthermore, as shown, the scheduled event 414 also includes a prerequisite identifier 417 of <1100> (e.g., the scheduled event 414 depends on the completion of the event with the pre-fulfillment identifier 402 of <1100>).

As shown in FIG. 4, the orchestration pipeline interface system 102 compares the prerequisite identifier 417 of the scheduled event 414 with event identifiers published to the compound discovery event publication repository. In particular, FIG. 4 shows the orchestration pipeline interface system 102 comparing the fulfillment identifier 408 of <1104> tied to the pre-fulfillment identifier 402 of <1100> with the prerequisite identifier 417 of <1100>. In some such instances the orchestration pipeline interface system 102 determines the success event 410 satisfies the prerequisite of the scheduled event 414.

In one or more embodiments, the orchestration pipeline interface system 102 further publishes to the compound discovery event publication repository a prerequisite satisfied event 416 in response to determining satisfaction of the prerequisite. As mentioned above, in one or more embodiments, the orchestration pipeline interface system 102 utilizes a prerequisite listener model to monitor prerequisites for an event. In some such embodiments, the orchestration pipeline interface system 102 publishes to the compound discovery event publication repository an event indicated as "PREREQ_SATISFIED_1106." In publishing such an event, the notification dashboard of a user's computing device (e.g., the computing device associated with the scheduled event 414) can automatically trigger a compound discovery task (e.g., executing a machine learning model or initiating an experiment).

Although FIG. 4 illustrates a particular combination of events, the orchestration pipeline interface system 102 can monitor and identify a variety of different event combinations (e.g., greater than or fewer than those shown). For example, in one or more embodiments a sequence of events includes a scheduled event, a ready event, an initiation event, and a failure event. In some such embodiments, the initiation event and the failure event contain a respective fulfillment identifier along with the pre-fulfillment identifier (e.g., the pre-fulfillment identifier of the ready event). Further, in some such embodiments because the sequence of events includes the failure event, the orchestration pipeline interface system 102 determines the prerequisites for another event depending on the aforementioned event is not satisfied.

Furthermore, although not shown in FIG. 4, in one or more embodiments a sequence of events includes a ready event, an initiation event, a failure event, another initiation event, and a success event (e.g., a completion event). In some such embodiments, the initiation event, the failure event, and the other initiation event contain the pre-fulfillment event identifier of the ready event. Furthermore, in some instances, an additional event can contain a prerequisite of the failure event with the specific pre-fulfillment event identifier. Accordingly, upon determining the failure event, the orchestration pipeline interface system 102.

Moreover, although not shown, in some embodiments the sequence of events can include a different combination of the pre-fulfillment events and the fulfillment events discussed above. Furthermore, in some embodiments, events can have prerequisites on any number of pre-fulfillment events and/or fulfillment events. Moreover, in some embodiments there can be multiple events depending on the specific occurrence of an event published to the compound discovery event publication repository.

Although not illustrated, in some embodiments, the orchestration pipeline interface system 102 further reprocesses (e.g., re-publishes) one or more events. For instance, in some embodiments the orchestration pipeline interface system 102 detects a fulfillment event (e.g., the success event 410). In some such instances, the orchestration pipeline interface system 102 can determine that the fulfillment event was not actually complete. For example, a client device can determine phenomic images were missing, blurry, or otherwise incomplete/inaccurate. The orchestration pipeline interface system 102 can determine that the images have been recaptured (or otherwise corrected/completed). Moreover, the orchestration pipeline interface system 102 can re-process/re-publish the fulfillment event (e.g., the success event 410). In such circumstances, for example, the re-published fulfillment event can include context describing the need for an additional fulfillment event (e.g., indicating that phenomic images were incomplete and they have been recaptured) and/or instructions for downstream tasks (e.g., a need to re-perform feature extraction processes). The orchestration pipeline interface system 102 can re-publish a variety of different events described herein, including pre-fulfillment events or fulfillment events, to the compound discovery event publication repository.

Figure 5:
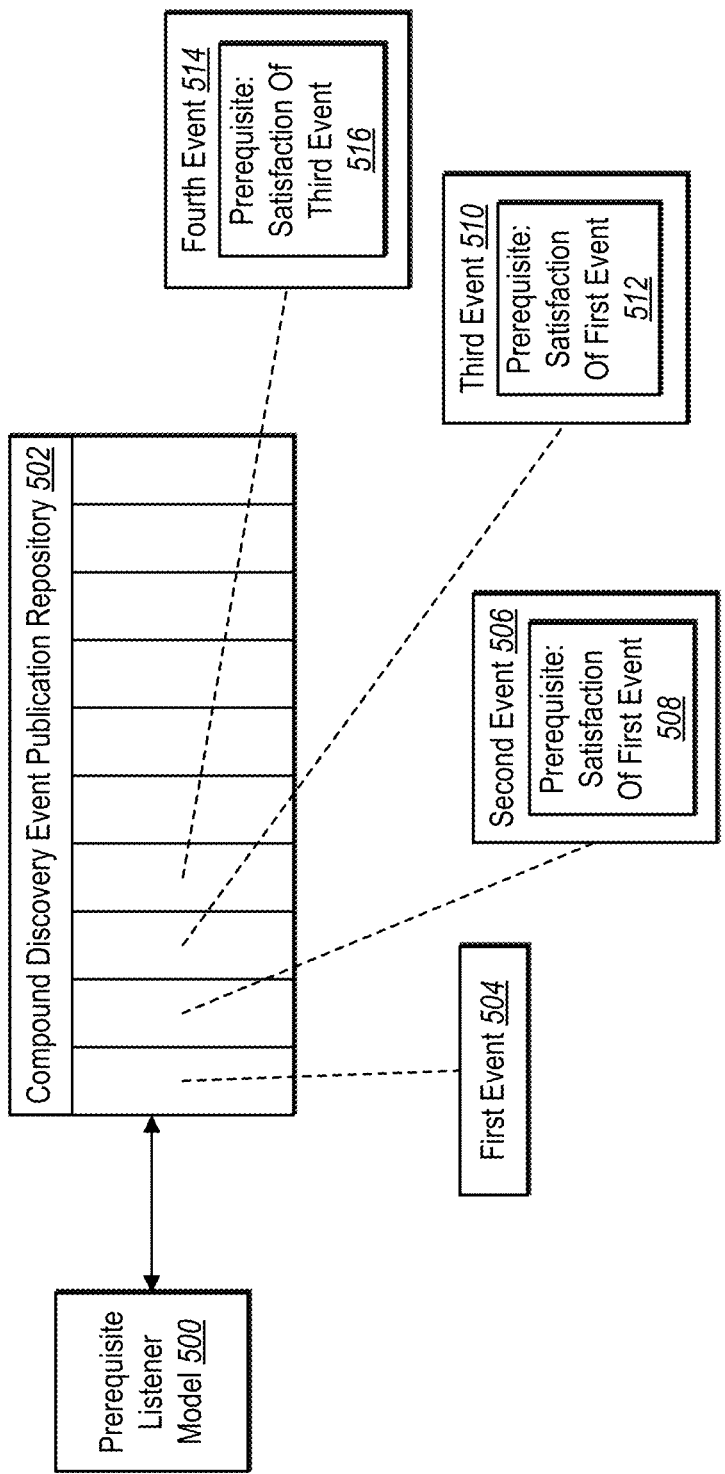
FIG. 5 illustrates an example diagram of the orchestration pipeline interface system utilizing a prerequisite listener model to monitor a compound discovery event publication repository in accordance with one or more embodiments.

As mentioned above, the orchestration pipeline interface system 102 monitors the compound discovery event publication repository to detect the satisfaction of various prerequisite events. FIG. 5 illustrates a diagram of the orchestration pipeline interface system 102 utilizing a prerequisite listener model to monitor the compound discovery event publication repository in accordance with one or more embodiments.

For example, FIG. 5 shows the orchestration pipeline interface system 102 utilizing a prerequisite listener model 500 to monitor a compound discovery event publication repository 502. In one or more embodiments, the prerequisite listener model 500 monitors the compound discovery event publication repository 502 for detecting RUN_SUCCEEDED events (e.g., fulfillment events of completion). For instance, in some embodiments the prerequisite listener model 500 queries for not yet satisfied events and identifies the corresponding prerequisites.

In some embodiments, the prerequisite listener model 500 queries the not yet satisfied events from a database separate from the compound discovery event publication repository 502, while in some embodiments the prerequisite listener model 500 queries the not yet satisfied events from the compound discovery event publication repository 502. Further, in some such embodiments the prerequisite listener model 500 consumes RUN_SUCCEEDED events published to the compound discovery event publication repository 502 and compares the consumed RUN_SUCCEEDED events to the not yet satisfied prerequisites.

In some embodiments, the prerequisite listener model 500 determines the satisfaction of a prerequisite and publishes to the compound discovery event publication repository 502, PREREQS_SATISFIED. Furthermore, in some instances an event includes multiple prerequisites, and for each satisfaction of a prerequisite, the prerequisite listener model 500 publishes a separate PREREQS_SATISFIED for the specific event.

In some embodiments, the orchestration pipeline interface system 102 publishes all PREREQS_SATISFIED to a single topic (e.g., Kafka topic) of the compound discovery event publication repository 502. In other embodiments, the orchestration pipeline interface system 102 publishes PREREQS_SATISFIED to separate topics corresponding to separate computing device systems (e.g., analytical devices, experimental devices, or a set of devices associated with a specific stage of compound drug discovery).

FIG. 5 illustrates the orchestration pipeline interface system 102 publishing a first event 504, a second event 506, a third event 510, and a fourth event 514 to the compound discovery event publication repository 502. Furthermore, as shown, the second event 506 includes a prerequisite 508 of satisfying the first event 504; the third event 510 also includes a prerequisite 512 of satisfying the first event 504; and the fourth event 514 includes a prerequisite 516 of satisfying the third event 510. Thus, the compound discovery event publication repository 502 can include a variety of non-linear interacting events. Moreover, the orchestration pipeline interface system 102 can monitor the compound discovery event publication repository 502 to determine when events have been completed (and when prerequisites have been satisfied) to provide compound discovery status update notifications to various computing devices.

Figure 6:
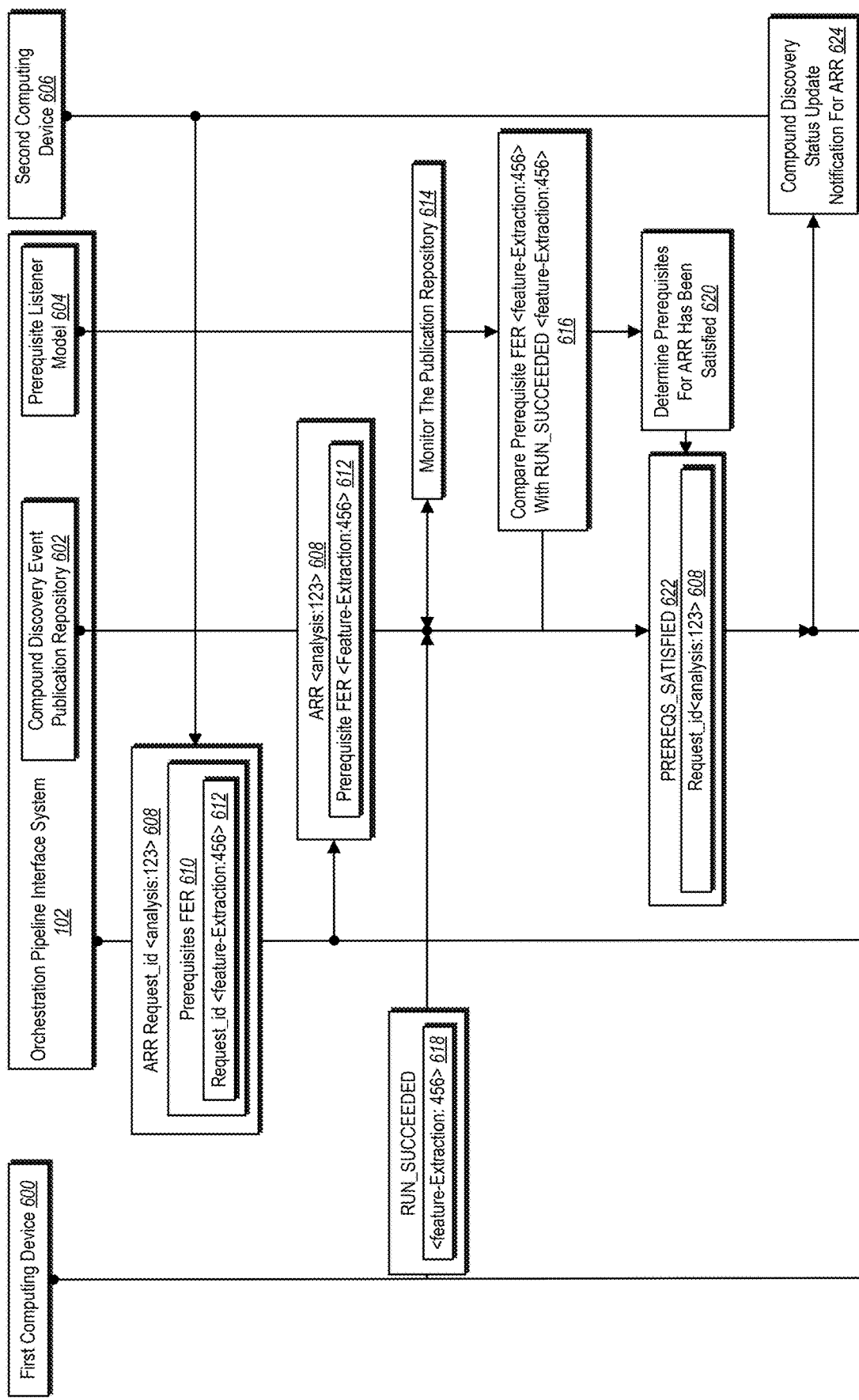
FIG. 6 illustrates an example diagram of the orchestration pipeline interface system determining the satisfaction of a prerequisite event in accordance with one or more embodiments.

FIG. 6 illustrates a diagram of the orchestration pipeline interface system 102 determining the satisfaction of a prerequisite event in accordance with one or more embodiments. For example, FIG. 6 shows a first computing device 600, a second computing device 606, a compound discovery event publication repository 602, and a prerequisite listener model 604. As shown, the orchestration pipeline interface system 102 receives from the second computing device 606 an event identifier 608 for an ARR (analysis run request) Request_id of <analysis:123>. Furthermore, as shown, the ARR Request_id includes a prerequisite FER 610 (feature extraction request) with a prerequisite identifier 612 of <feature-Extraction:456>.

Moreover, as shown in FIG. 6, the orchestration pipeline interface system 102 publishes the event identifier 608 for ARR Request_id of <analysis:123> with the prerequisite FER 610 to the compound discovery event publication repository 602 (e.g., a lifecycle.beta_va topic). Further, as shown, the orchestration pipeline interface system 102 receives an additional event identifier 618 for RUN_SUCCEEDED of <feature-Extraction:456> and publishes the additional event identifier 618 to the compound discovery event publication repository 602. Additionally, as shown in FIG. 6, the orchestration pipeline interface system 102 utilizes the prerequisite listener model 604 to perform an act 614 of monitoring the compound discovery event publication repository 602.

As shown, based on the orchestration pipeline interface system 102 utilizing the prerequisite listener model 604 to monitor the compound discovery event publication repository 602, the orchestration pipeline interface system 102 further performs an act 616. The act 616 includes comparing the prerequisite identifier 612 of <feature-Extraction:456> with the additional event identifier 618 of <feature-Extraction:456>. As shown in FIG. 6, the orchestration pipeline interface system 102 via the prerequisite listener model 604 further performs an act 620 of determining the prerequisites for ARR Request_id <analysis:123> have been satisfied.

Moreover, as shown, in response to the act 620, the orchestration pipeline interface system 102 utilizes the prerequisite listener model 604 to publish PREREQS_SATISFIED 622 for the event identifier 608 of <analysis:123>. As shown, the orchestration pipeline interface system 102 publishing PREREQS_SATISFIED further causes the orchestration pipeline interface system 102 to transmit a compound discovery status update notification 624 for ARR Request_id.

In some embodiments, the orchestration pipeline interface system 102 transmits the compound discovery status update notification 624 to the second computing device 606 by utilizing the prerequisite listener model 604. In some embodiments, the transmittal of the compound discovery status update notification 624 to the second computing device 606 comes from the compound discovery event publication repository 602 or some other computing device/source.

In one or more embodiments, the orchestration pipeline interface system 102 separates the pre-fulfillment events, the fulfillment events, and the prerequisite satisfied events from computational analysis runs (e.g., taskstore runs performed by applying a machine learning analysis on the experiment). For instance, computational analysis runs include separate iterations of applying a computational analysis to an experiment. Further, in some instances the orchestration pipeline interface system 102 stores each separate iteration of applying a computational analysis to an experiment in a taskstore data structure (e.g., separate from the compound discovery event publication repository 602).

Moreover, in some embodiments the orchestration pipeline interface system 102 ties together each separate iteration attempt of applying a computational analysis to an experiment (as opposed to linking all the separate iterations to the experiment). In some such embodiments, linking together each separate iteration attempt of applying a computational analysis allows a user of a computing device to directly query and analyze multiple analysis attempts for a single experiment.

Further, in some embodiments the orchestration pipeline interface system 102 stores the separate iterations of applying a computational analysis to an experiment in the compound discovery event publication repository 602. Additionally, the separate iterations of applying a computational analysis to an experiment also includes a unique identifier (e.g., analysis_taskstore_request_id).

Figure 7:
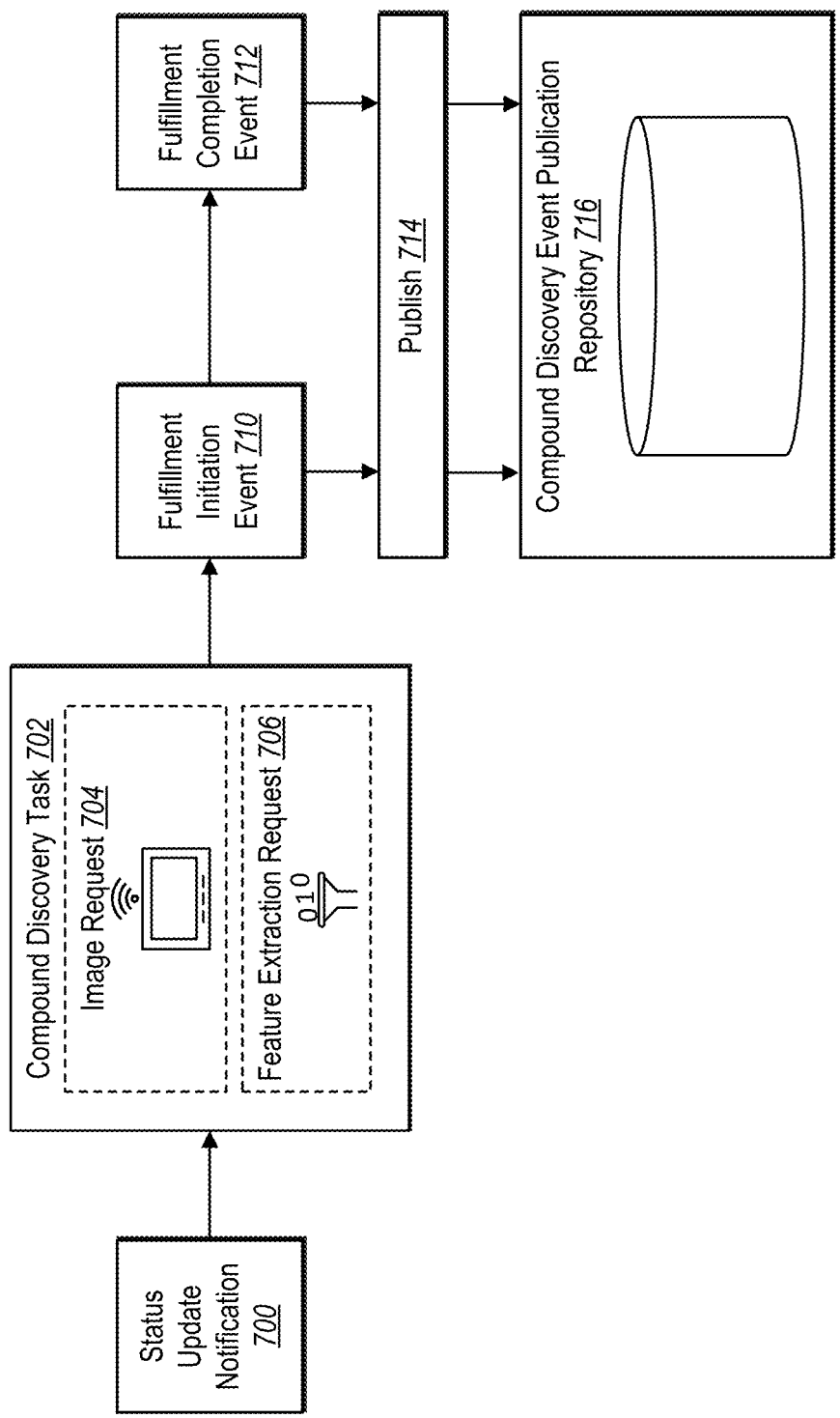
FIG. 7 illustrates an example diagram of the orchestration pipeline interface system triggering a compound discovery task in response to a status update notification in accordance with one or more embodiments.

As mentioned above, the orchestration pipeline interface system 102 transmits a status update notification to one or more computing device and in some instances triggers a compound discovery task. FIG. 7 illustrates the orchestration pipeline interface system 102 transmitting a status update notification in accordance with one or more embodiments.

For example, FIG. 7 shows a status update notification 700 from the orchestration pipeline interface system 102 which triggers a compound discovery task 702 (e.g., either provides an option for a user of a computing device to manually activate the compound discovery task 702 or automatically activates the compound discovery task 702). In one or more embodiments, the compound discovery task 702 includes one or more tasks involved in the compound discovery process pipeline. For instance, the compound discovery task 702 includes an image request 704, a feature extraction request 706, or in some instances, executing another experiment or series of experiments.

In some embodiments, the image request 704 includes performing tasks related to visualizing and analyzing biological processes, cellular structures, interactions, and deviations. For instance, as mentioned above, the image request 704 can include initiating a cellular biological assay on a particular stem cell with one or more perturbations (e.g., CRISPR gene knockouts and/or compound perturbations). The orchestration pipeline interface system 102 can initiate an automated experiment to develop the stem cell and capture digital images of the phenotype resulting from the perturbation. Such phenotype digital images that can then be utilized in a variety of downstream processes to understand specific mechanisms and interactions that further contributes to modifying or enhancing the development of compounds.

In some embodiments, the feature extraction request 706 includes selecting and transforming relevant attributes or information from raw experimental data. For example, the feature extraction request 706 can include generating machine learning embeddings from phenomic digital images. Further, in some embodiments the feature extraction request 706 includes extracting other aspects or features for utilization with other models (e.g., through various machine learning algorithms).

Although FIG. 7 illustrates two example compound discovery tasks, the orchestration pipeline interface system 102 can automatically trigger a variety of different tasks. For example, in some embodiments, the orchestration pipeline interface system 102 applies various computational models and/or generates and analyzes maps of biology (e.g., heatmaps of related perturbations).

As further shown in FIG. 7, based on the status update notification 700 triggering the compound discovery task 702, the orchestration pipeline interface system 102 further receives a fulfillment initiation event 710 and a fulfillment completion event 712. Moreover, as shown, the orchestration pipeline interface system 102 performs an act 714 of publishing the fulfillment initiation event 710 and the fulfillment completion event 712 to a compound discovery event publication repository 716. Thus, the orchestration pipeline interface system 102 can provide status update notifications, that further trigger compound discovery tasks, which generate and publish additional events that drive additional notifications and automatic advancement of the compound discovery pipeline.

Figure 8:
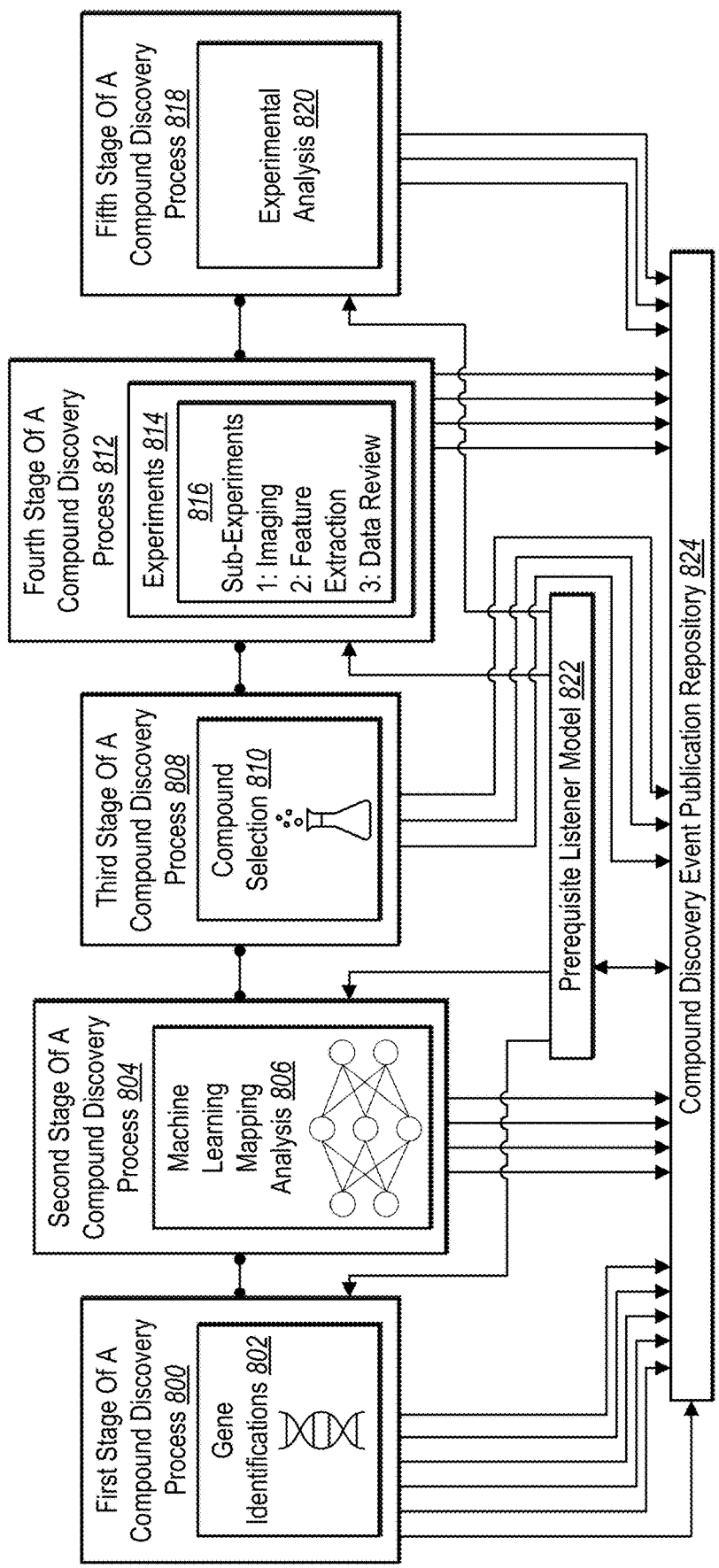
FIG. 8 illustrates an example diagram of various stages of the compound drug discovery process and events published to the compound discovery event publication repository from the various stages of the process in accordance with one or more embodiments.

As mentioned above, in some embodiments the compound discovery process involves multiple non-linear and inter-relates stages. FIG. 8 illustrates various stages of the compound discovery process and publishing multiple events to the compound discovery event publication repository in accordance with one or more embodiments. For example, FIG. 8 illustrates the ability of the orchestration pipeline interface system 102 to operate in an environment with multiple different processes and multiple sets of computing devices (e.g., the orchestration pipeline interface system 102 can operate in a variety of scales and is extensible to environments with a large number of devices and events).

In one or more embodiments, the orchestration pipeline interface system 102 operates within a compound discovery processing pipeline by monitoring requests (pre-fulfillment events) and fulfillment events emitted from different systems, generating a uniform schema for all the events emitted from different systems, persisting the emitted events in a common repository topic (e.g., the compound discovery event publication repository 824), and performing prerequisite orchestration, where each request may include a list of prerequisites that must be fulfilled prior to a run (e.g., fulfillment event) for a request to be initiated.

As illustrated, FIG. 8 shows a first stage 800 of a compound discovery process that includes gene identifications 802. For instance, FIG. 8 shows multiple arrows from the first stage 800 of compound discovery process which indicates multiple events being published to the compound discovery event publication repository 824. For instance, the multiple events for the first stage 800 can include a combination of events such as scheduled, ready, initialized, completed and another combination of events of initialized and failed. Further, in some embodiments the first stage 800 includes multiple iterations to perform the gene identifications 802.

Moreover, FIG. 8 shows a second stage 804 of a compound discovery process that includes a machine learning mapping analysis 806. Like the first stage 800, the second stage 804 can also include multiple events and analysis runs. For instance, after identifying a gene, the second stage 804 includes applying an analysis or applying multiple rounds of analysis to the identified gene. As discussed above, the machine learning mapping analysis 806 can include comparing embeddings from phenotype digital images to identify inter-related genes and compounds. Similarly, the machine learning mapping analysis 806 can include other machine learning processes, such as utilizing a protein-compound machine learning model to identify one or more potential binding sites. In some embodiments, the second stage 804 also includes multiple events published to the compound discovery event publication repository 824.

Further, FIG. 8 shows a third stage 808 of compound selection 810 (e.g., a process for analyzing various features corresponding to genes and compounds to select a compound for further experimentation and analysis). Moreover, FIG. 8 also shows a fourth stage 812 of a compound discovery process that includes performing experiments 814 and sub-experiments 816. For instance, as shown in FIG. 8 and discussed above, the sub-experiments 816 can include imaging, feature extraction, and data review to determine additional interactions between the targeted compound(s) and corresponding genes.

Further, FIG. 8 shows a fifth stage 818 of a compound discovery process with an experimental analysis 820 (e.g., analyzing the experimental data/results). For instance, in some embodiments the fifth stage 818 of the compound discovery process includes Trekseq (e.g., an orthogonal assay). In one or more embodiments, Trekseq includes RNA sequencing to count the number of express proteins that map to a particular gene (e.g., knocking out a gene to see how much of a gene is expressed). Further, in some embodiments Trekseq involves analyzing the transcriptome of a cell, where transcriptome includes messenger RNA, non-coding RNA and other RNA molecules in a cell.

As shown in FIG. 8, the orchestration pipeline interface system 102 utilizes a prerequisite listener model 822 to detect a plurality of events published to the compound discovery event publication repository 824. In particular, the orchestration pipeline interface system 102 utilizes the prerequisite listener model 822 and transmits notifications to one or more computing devices associated with the notification.

For instance, the prerequisite listener model 822 transmits a notification to a computing device in response to the computing device being associated with an event where the prerequisites have been satisfied. Moreover, in one or more embodiments, the prerequisite listener model 822 transmits a notification for the satisfaction of prerequisites associated with a specific stage to a set of computing devices corresponding to the specific stage of a compound discovery process.

In one or more embodiments, the orchestration pipeline interface system 102 implements a strategy model to execute specific types of analysis. For instance, in some embodiments the orchestration pipeline interface system 102 configures steps for processing a type of experiment. Specifically, in some embodiments the orchestration pipeline interface system 102 designates an experiment of type "A" to undergo a feature extraction with model "B" where the extracted features from model "B" are further analyzed with analysis "C."

In some embodiments, the orchestration pipeline interface system 102 provides an option to configure an event to include results from an upstream event to be included in a contextual data field for the event. Thus, for example, results from a feature extraction of the sub-experiments 816 in the fourth stage 812 could be included in the contextual data field of a subsequent data review in the fourth stage 812 (e.g., or alternatively the results of the feature extraction could be included in the contextual data field of the experimental analysis 820 in the fifth stage 818). For instance, the orchestration pipeline interface system 102 can include the results of a first event within the contextual data field of a second event by utilizing an application programming interface (API) query.

In one or more embodiments the orchestration pipeline interface system 102 publishes events to the compound discovery event publication repository 824 that includes machine learning training, machine learning evaluation, molecular docking and similarity searching (e.g., FastROCS searches), metric and analysis backfills, extract-transform-load pipelines (ETL), and large campaigns.

Further, in some embodiments the orchestration pipeline interface system 102 applies to industrial program generation environments. For instance, an industrial program generation (IPG) includes (i) a hit selection to identify statistically strong connections in a biological map to patient-informed phenotypes, (ii) phenomic confirmation (e.g., promising actives are confirmed by automated similarity and concentration-response analytics), (iii) Trekseq confirmation (e.g., compound and gene relationships are confirmed with transcriptomics in the map background), and (iv) Structure-Activity Relationship (SAR) confidence (e.g., actives that behave as a series are identified, and an automated recommendation for expansion is identified).

Moreover, in some embodiments the orchestration pipeline interface system 102 applies to industrialized compound generation (ICG). For instance, ICG applies to steps subsequent to IPG. Further, in some embodiments ICG includes rapidly searching and expanding from potential hit series in the chemical space (e.g., identified at the IPG stage) and testing the potential hits with various analytical tests (e.g., SAR screens). Accordingly, in some embodiments the orchestration pipeline interface system 102 implements monitoring and detecting of events for IPG and ICG as discussed above and in a manner similar to what is illustrated in FIG. 8.

In some embodiments, IPG can act as a parent event with the various events or stages illustrated in FIG. 8 acting as child events. For example, a downstream process can list "IPG" as a prerequisite event and IPG can link to multiple child events corresponding to the various stages shown in FIG. 8. Upon completion of all of the child events, the parent event can be satisfied and initiate a downstream process (e.g., one or more ICG processes). Similarly, although not shown in FIG. 8, in one or more embodiments, each of the stages (first stage to the fifth stage) shown in FIG. 8 can act as a parent event.

Figure 9:
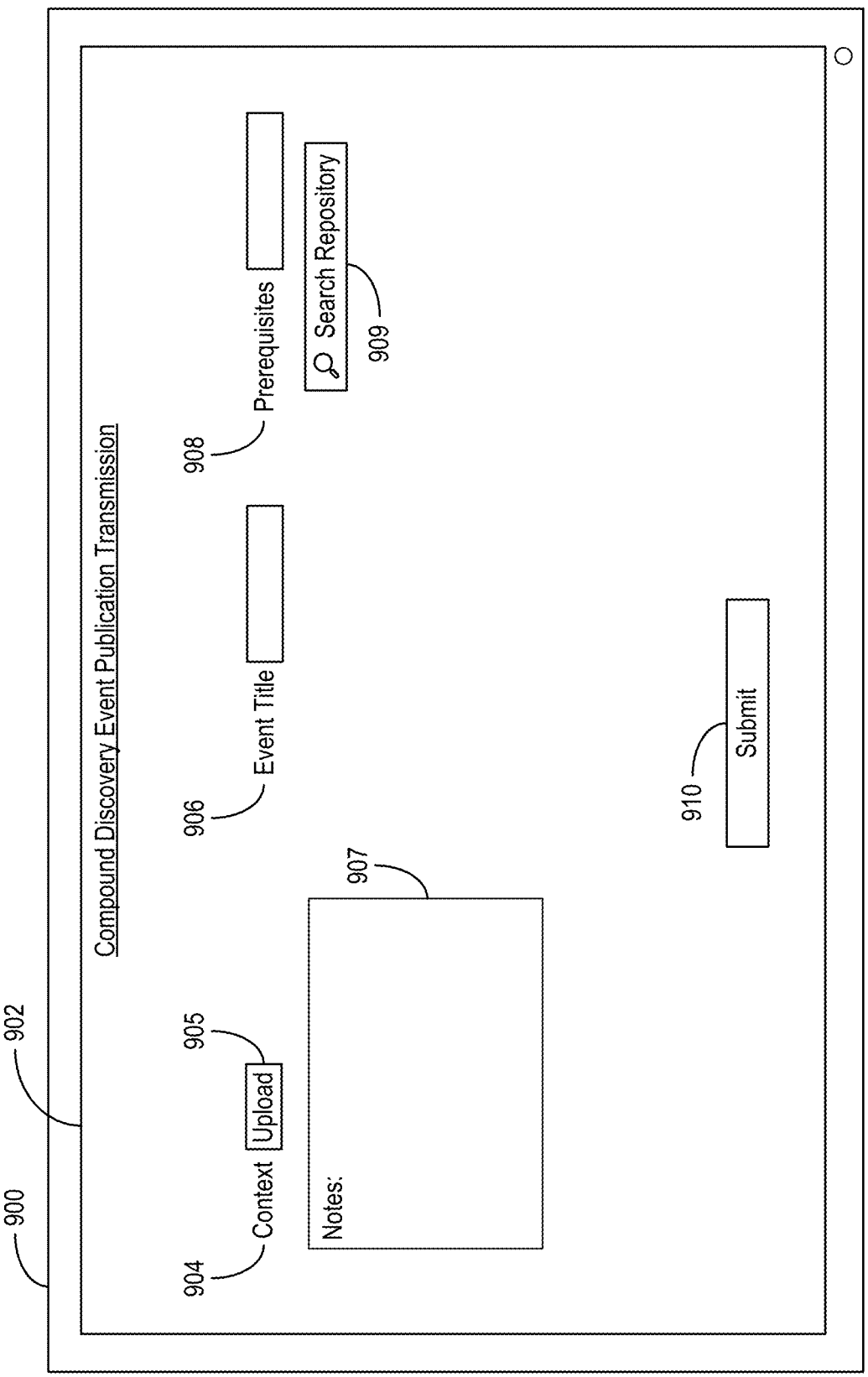
FIG. 9 illustrates an example graphical user interface of a user of a computing device transmitting a compound discovery event publication in accordance with one or more embodiments.

FIG. 9 illustrates a graphical user interface of a computing device transmitting a compound discovery event publication in accordance with one or more embodiments. For example, FIG. 9 shows a graphical user interface 902 of a computing device 900 that provides an option for a user of the computing device 900 to submit a compound discovery event publication transmission. For instance, FIG. 9 shows a context element 904 to allow a user to select an upload element 905 to upload content and/or add notes within an input text box 907.

Further, FIG. 9 shows an event title element 906 for a user to create a title for the compound discovery event publication transmission. Moreover, FIG. 9 also shows a prerequisites element 908 for manually inputting one or more prerequisites. Further, FIG. 9 shows a search element 909 for searching one or more repositories (e.g., the compound discovery event publication repository) to add as a prerequisite. Additionally, the graphical user interface 902 also includes a submit element 910 to submit to compound discovery event publication transmission to the orchestration pipeline interface system 102.

Although not shown in FIG. 9, in one or more embodiments, the graphical user interface further includes an event change element. For instance, the event change element includes an indication to modify or change prerequisites for an event, contextual data, a title, or another field of the event already submitted to the orchestration pipeline interface system 102. Further, in some embodiments the orchestration pipeline interface system 102 publishes any changes indicated by the event change to the compound discovery event publication repository.

Figure 10:
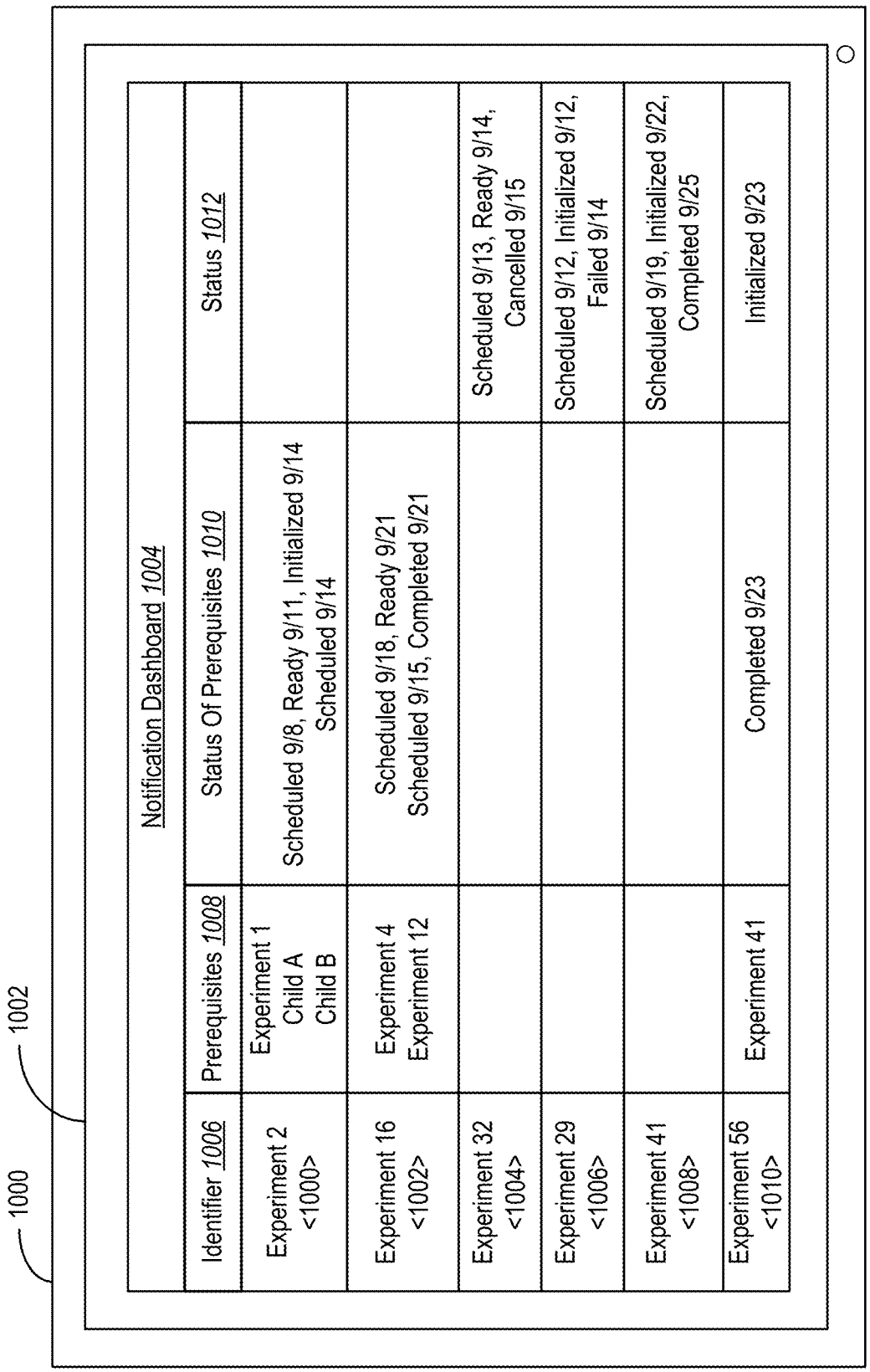
FIG. 10 illustrates an example graphical user interface of a user of a notification dashboard regarding a variety of events in accordance with one or more embodiments.

FIG. 10 illustrates an example graphical user interface of a notification dashboard for a variety of events in accordance with one or more embodiments. For example, FIG. 10 shows a notification dashboard 1004 displayed via a graphical user interface 1002 of a computing device 1000. Further, FIG. 10 shows on the notification dashboard 1004 an event column 1006, a prerequisites column 1008, a status of prerequisites column 1010, and an event status column 1012.

To illustrate, FIG. 10 shows experiment 2 (e.g., with event identifier <1000>) under the identifier column 1006 with prerequisites 1008 of experiment 1 which further contain child A and child B. Moreover, as shown, the status of child A is shown as "scheduled 9/8, ready 9/11, initialized 9/14" (indicating that a scheduled event was published on 9/8, a ready event was published on 9/11, and an initialized event was published on 9/14) and the status of child B is shown as "scheduled 9/14" (indicating that a scheduled event for child B was published on 9/14). Accordingly, when child A and child B have succeeded (e.g., completion event), then the orchestration pipeline interface system 102 would update the graphical user interface to reflect the completed nature of experiment 1.

Further, FIG. 10 shows experiment 16 (e.g., with event identifier <1002>) with the prerequisites 1008 of experiment 4 and experiment 12. Moreover, experiment 4 has a status of "scheduled 9/18, ready 9/21" and experiment 12 has a status of "scheduled 9/15, completed 9/21." For instance, the graphical user interface 1002 shows "status of prerequisites," however in some embodiments status equates to an event (e.g., scheduled event, ready event, initialized event, completed event, etc.). Thus, FIG. 10 shows experiment 16 with event identifier <1002> as having two separate prerequisite events. Accordingly, experiment 16 depends on the upstream completion of experiment 4 (e.g., because experiment 12 has already been completed).

Moreover, FIG. 10 also shows experiment 32 with the event identifier <1004>, experiment 29 with the event identifier <1006>, and experiment 41 with the event identifier <1008> and without any prerequisites 1008, but with various statuses. For instance, experiment 32 includes "scheduled 9/13, ready 9/14, cancelled 9/15," experiment 29 includes "scheduled 9/12, initialized 9/12, failed 9/14" and experiment 41 includes "scheduled 9/19, initialized 9/22, completed 9/25." Furthermore, experiment 56 with the event identifier <1010> shows prerequisites 1008 of experiment 41 which was completed 9/23, thus the status of experiment 56 is "initialized 9/23."

As shown in FIG. 10, the orchestration pipeline interface system 102 can show all statuses of a prerequisite or event on the notification dashboard 1004. In some embodiments however, the orchestration pipeline interface system 102 can just show the latest status or it can show a predetermined number of statuses (e.g., the last 3 or the last 10, etc.).

Furthermore, although not shown in FIG. 10, in one or more embodiments, the orchestration pipeline interface system 102 provides an option to input a status query. For example, the status query includes a computing device querying the orchestration pipeline interface system 102 for an update of a compound discovery event. For instance, the status query includes an event identifier or another identifier tied to an event identifier. Moreover, in response to the status query, the orchestration pipeline interface system 102 provides a status response. For instance, the status response indicates a pre-fulfillment event or a fulfillment event.

Moreover, although not shown in FIG. 10, in some embodiments the orchestration pipeline interface system 102 causes the graphical user interface 1002 of the notification dashboard 1004 to show an option to transition to an additional graphical user interface. For instance, the orchestration pipeline interface system 102 causes the graphical user interface 1002 to show a link for the event with prerequisites satisfied and clicking on the link causes the graphical user interface 1002 to transition to the additional graphical user interface that includes options to trigger a compound discovery task for the event with satisfied prerequisites.

Although FIG. 10 shows "experiments" in one or more embodiments, the notification dashboard 1004 illustrates other events (e.g., gene identification, machine learning mapping analysis, compound selection, Trekseq, imaging, feature extraction, data review, and/or other forms of analysis relevant to experiments or the compound discovery process).

Moreover, in one or more embodiments orchestration pipeline interface system 102 enhances the ability (e.g., via the notification dashboard 1004) to analyze a compound discovery process. For instance, the orchestration pipeline interface system 102 provides analytical tools to identify time or resources utilized for a particular stage, experiment, analysis, or other event (e.g., identify events consume time and computational resources by looking at time stamps between events corresponding to the same identifier). To illustrate, in some embodiments the notification dashboard 1004 provides a tool to query which upstream events are delaying downstream events (e.g., an upstream event where a high number of downstream events have indicated the upstream event as a prerequisite).

Further, in some embodiments the orchestration pipeline interface system 102 (e.g., via the notification dashboard 1004 and the prerequisite listener model) provides tools to analyze various dependencies across events (e.g., prerequisite chains or links from a single event or multiple events with a single or multiple upstream events). In some instances, the orchestration pipeline interface system 102 provides text representations or visual representations of the chains or links from one or many events to other events. Thus, the orchestration pipeline interface system 102 can also provide visual insights into relations across a compound discovery process.

FIGS. 1-10, the corresponding text, and the examples provide a number of different systems, methods, and non-transitory computer readable media for transmitting a compound discovery status update notification to one or more computing devices. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
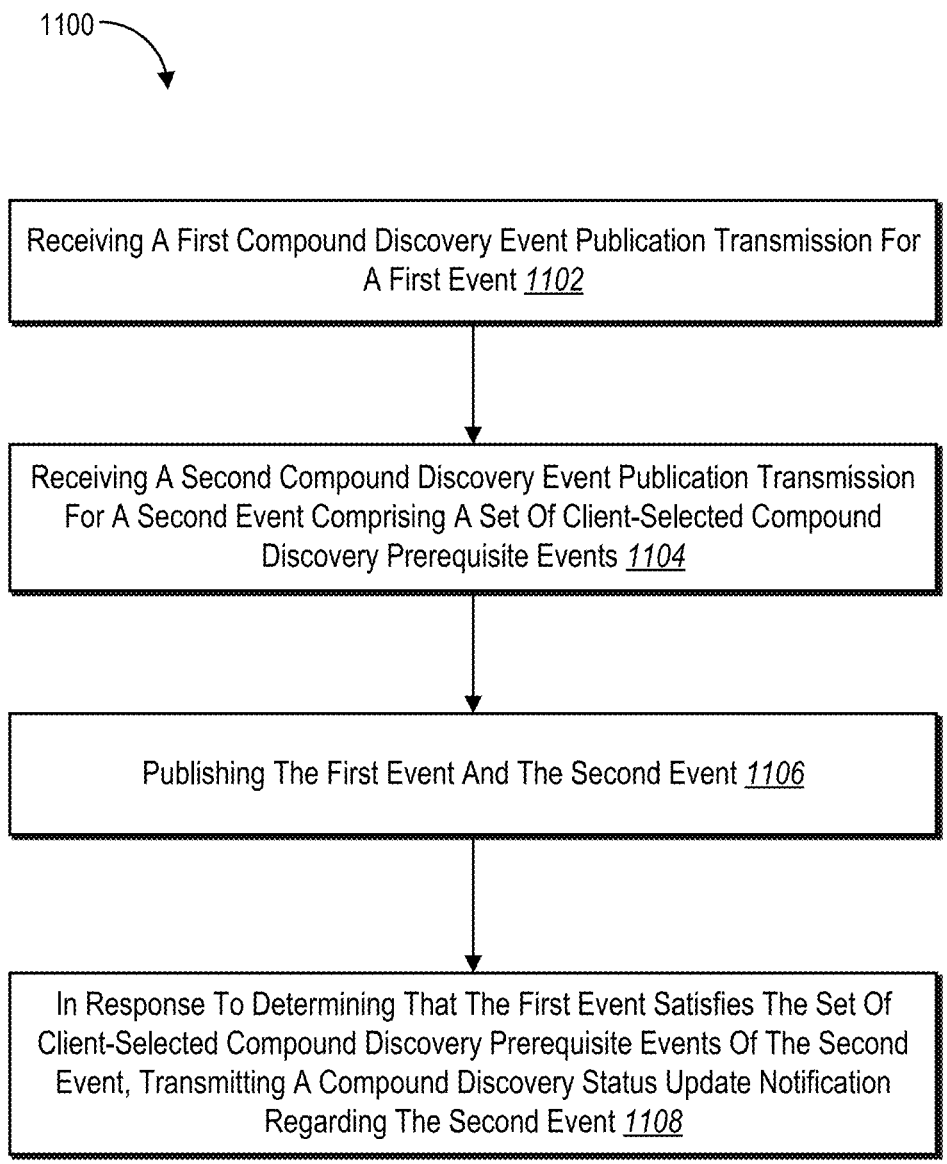
FIG. 11 illustrates an example series of acts for transmitting a compound discovery status update notification in accordance with one or more embodiments.

While FIG. 11 illustrates acts according to some embodiments, alternative embodiments may omit, add to, reorder, and/or modify any of the acts shown in FIG. 11. The acts of FIG. 11 can be performed as part of a method (e.g., a computer-implemented method). Alternatively, a non-transitory computer readable medium can comprise instructions, that when executed by one or more processors (e.g., at least one processor), cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for transmitting a compound discovery status update notification to one or more computing devices. The series of acts 1100 can include acts 1102-1108 of receiving a first compound discovery event publication transmission for a first event; receiving a second compound discovery event publication transmission for a second event comprising a set of client-selected compound discovery prerequisite events; publishing the first event and the second event; in response to determining that the first event satisfies the set of client-selected compound discovery prerequisite events of the second event, transmitting a compound discovery status update notification regarding the second event.

For example, in one or more embodiments, the acts 1102-1108 include receiving, from a first computing device, a first compound discovery event publication transmission for a first event comprising a first client-selected event title and a first event identifier; receiving, from a second computing device, a second compound discovery event publication transmission for a second event comprising a second client-selected event title, a second event identifier, and a set of client-selected compound discovery prerequisite events; publishing the first event and the second event to a compound discovery event publication repository; monitoring the compound discovery event publication repository to extract the first event identifier from the first event and the first event identifier from the set of client-selected compound discovery prerequisite events of the second event; and in response to determining, utilizing the first event identifier, that the first event satisfies the set of client-selected compound discovery prerequisite events of the second event, transmitting, to one or more computing devices, a compound discovery status update notification regarding the second event.

In one or more implementations, the series of acts 1100 include upon determining that the first event satisfies the set of client-selected compound discovery prerequisite events of the second event, publishing a prerequisite satisfied event, and in response, causing one or more computing devices to initiate a compound discovery task corresponding to the second event.

In addition, in one or more implementations, the series of acts 1100 includes upon determining that the first event satisfies the set of client-selected compound discovery prerequisite events of the second event, publishing a fulfillment initiation event to the compound discovery event publication repository, the fulfillment initiation event comprising the second event identifier corresponding to the pre-fulfillment event.

Further, in some implementations, the series of acts 1100 includes upon detecting a completion corresponding to the fulfillment initiation event, publishing a fulfillment completion event to the compound discovery event publication repository, the fulfillment completion event comprising the second event identifier corresponding to the pre-fulfillment event.

In one or more implementations, the series of acts 1100 includes receiving, from a third computing device, a third compound discovery event publication transmission for a third event comprising a third client-selected event title, a third event identifier, and an additional set of client-selected compound discovery prerequisite events. Moreover, in one or more implementations, the series of acts 1100 includes determining the fulfillment completion event comprising the second event identifier satisfies the additional set of client-selected compound discovery prerequisite events; and transmitting an additional compound discovery status update notification regarding the third event.

In addition, in some implementations, the series of acts 1100 includes in response to receiving a status query from an additional computing device regarding the second event, generating a status response by searching the compound discovery event publication repository utilizing the second event identifier.

Further, in one or more implementations, the series of acts 1100 includes in response to receiving an event change request from one or more client devices, changing a prerequisite of the set of client-selected compound discovery prerequisite events for the second event. In some implementations, the series of acts 1100 includes providing, for display via the second computing device, an event configuration user interface; and receiving the set of client-selected compound discovery prerequisite events and the second client-selected event title based on a user interaction with the event configuration user interface.

In addition, in one or more implementations, the series of acts 1100 includes receiving the second compound discovery event publication transmission further comprises receiving contextual data of the second compound discovery event publication transmission; and transmitting the compound discovery status update notification comprises transmitting the contextual data of the second compound discovery event publication transmission.

Further, in one or more implementations, the series of acts 1100 includes the first event comprises a parent fulfillment event comprising a parent identifier corresponding to a plurality of child events comprising the parent identifier and a plurality of child identifiers. In some implementations, the series of acts 1100 includes publishing the first event comprises: monitoring the compound discovery event publication repository for the plurality of child identifiers and the parent identifier; and publishing the parent fulfillment event in response to identifying a plurality of fulfillment completion events comprising the parent identifier and the plurality of child identifiers via the compound discovery event publication repository.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
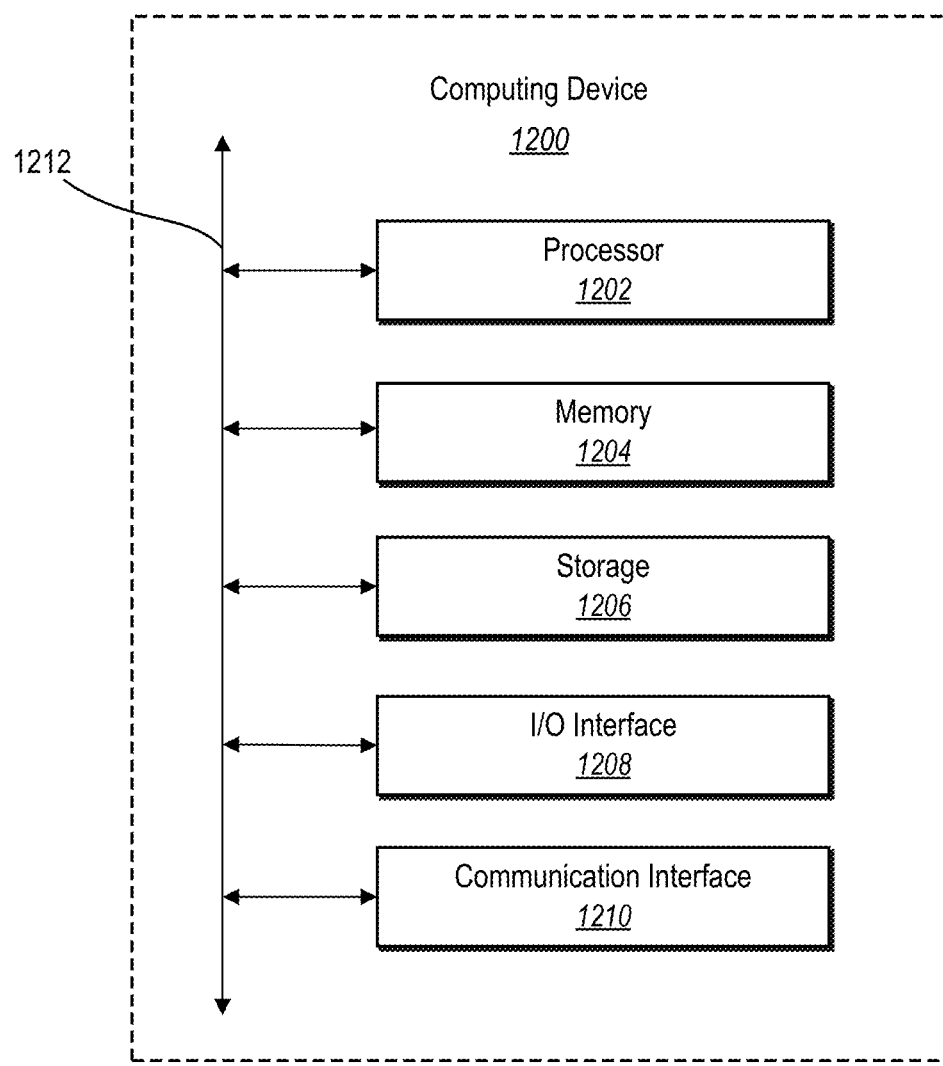
FIG. 12 illustrates a block diagram of a computing device for implementing one or more embodiments.

FIG. 12 illustrates a block diagram of an example computing device 900 that may be configured to perform one or more of the processes described above. One will appreciate that one or more computing devices, such as the computing device 1200 may represent the computing devices described above. In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 900 to each other.

In one or more implementations, various computing devices can communicate over a computer network. This disclosure contemplates any suitable network. As an example, and not by way of limitation, one or more portions of a network may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these.

In particular embodiments, the computing device 1200 can include a client device that includes a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device one or more Hyper Text Markup Language ("HTML") files responsive to the HTTP request. The client device may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the tech-bio exploration system 104 may include a variety of servers, sub-systems, programs, modules, logs, and data stores. In particular embodiments, the tech-bio exploration system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The tech-bio exploration system 104 may also include suitable components such as network interfaces, security mechanisms, load balancers, failover servers, management-and-network-operations consoles, other suitable components, or any suitable combination thereof. In particular embodiments, the tech-bio exploration system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the tech-bio exploration system 104 and one or more client devices. An action logger may be used to receive communications from a web server about a user's actions on or off the tech-bio exploration system 104. In conjunction with the action log, a third-party-content-object log may be maintained of user exposures to third-party-content objects. A notification controller may provide information regarding content objects to a client device. Information may be pushed to a client device as notifications, or information may be pulled from a client device responsive to a request received from the client device. Authorization servers may be used to enforce one or more privacy settings of the users of the tech-bio exploration system 104. A privacy setting of a user determines how particular information associated with a user can be shared. The authorization server may allow users to opt in to or opt out of having their actions logged by the tech-bio exploration system 104 or shared with other systems, such as, for example, by setting appropriate privacy settings. Third-party-content-object stores may be used to store content objects received from third parties. Location stores may be used for storing location information received from a client device associated with users.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, from a first computing device, a first compound discovery event publication transmission for a first event comprising a first client-selected event title and a first event identifier;
   receiving, from a second computing device, a second compound discovery event publication transmission for a second event comprising a second client-selected event title, a second event identifier, and a set of client-selected compound discovery prerequisite events;
   publishing the first event and the second event to a compound discovery event publication repository;
   monitoring the compound discovery event publication repository to extract the first event identifier from the first event and the first event identifier from the set of client-selected compound discovery prerequisite events of the second event; and
   in response to determining, utilizing the first event identifier, that the first event satisfies the set of client-selected compound discovery prerequisite events of the second event, transmitting, to one or more computing devices, a compound discovery status update notification regarding the second event.

2. The computer-implemented method of claim 1, wherein transmitting the compound discovery status update notification comprises, upon determining that the first event satisfies the set of client-selected compound discovery prerequisite events of the second event, publishing a prerequisite satisfied event, and in response, causing one or more computing devices to initiate a compound discovery task corresponding to the second event.

3. The computer-implemented method of claim 2, further comprising wherein the second event comprises a pre-fulfillment event and further comprising, upon determining that the first event satisfies the set of client-selected compound discovery prerequisite events of the second event, publishing a fulfillment initiation event to the compound discovery event publication repository, the fulfillment initiation event comprising the second event identifier corresponding to the pre-fulfillment event.

4. The computer-implemented method of claim 3, further comprising upon detecting a completion corresponding to the fulfillment initiation event, publishing a fulfillment completion event to the compound discovery event publication repository, the fulfillment completion event comprising the second event identifier corresponding to the pre-fulfillment event.

5. The computer-implemented method of claim 4, further comprising:
   receiving, from a third computing device, a third compound discovery event publication transmission for a third event comprising a third client-selected event title, a third event identifier, and an additional set of client-selected compound discovery prerequisite events;
   determining the fulfillment completion event comprising the second event identifier satisfies the additional set of client-selected compound discovery prerequisite events; and
   transmitting an additional compound discovery status update notification regarding the third event.

6. The computer-implemented method of claim 1, further comprising, in response to receiving a status query from an additional computing device regarding the second event, generating a status response by searching the compound discovery event publication repository utilizing the second event identifier.

7. The computer-implemented method of claim 1, further comprising, in response to receiving an event change request from one or more client devices, changing a prerequisite of the set of client-selected compound discovery prerequisite events for the second event.

8. The computer-implemented method of claim 1, wherein receiving the second compound discovery event publication transmission from the second computing device further comprises:
   providing, for display via the second computing device, an event configuration user interface; and
   receiving the set of client-selected compound discovery prerequisite events and the second client-selected event title based on a user interaction with the event configuration user interface.

9. The computer-implemented method of claim 1, wherein:
   receiving the second compound discovery event publication transmission further comprises receiving contextual data of the second compound discovery event publication transmission; and
   transmitting the compound discovery status update notification comprises transmitting the contextual data of the second compound discovery event publication transmission.

10. The computer-implemented method of claim 1, wherein:
    the first event comprises a parent fulfillment event comprising a parent identifier corresponding to a plurality of child events comprising the parent identifier and a plurality of child identifiers; and
    publishing the first event comprises:
      monitoring the compound discovery event publication repository for the plurality of child identifiers and the parent identifier; and
      publishing the parent fulfillment event in response to identifying a plurality of fulfillment completion events comprising the parent identifier and the plurality of child identifiers via the compound discovery event publication repository.

11. A system comprising:
    at least one processor; and
    at least one non-transitory computer-readable storage medium storing instructions that, when executed by the at least one processor, cause the system to:
    receive, from a first computing device, a first compound discovery event publication transmission for a first event comprising a first client-selected event title and a first event identifier;
    receive, from a second computing device, a second compound discovery event publication transmission for a second event comprising a second client-selected event title, a second event identifier, and a set of client-selected compound discovery prerequisite events;
    publish the first event and the second event to a compound discovery event publication repository;
    monitor the compound discovery event publication repository to extract the first event identifier from the first event and the first event identifier from the set of client-selected compound discovery prerequisite events of the second event; and
    in response to determining, utilizing the first event identifier, that the first event satisfies the set of client-selected compound discovery prerequisite events of the second event, transmit, to one or more computing devices, a compound discovery status update notification regarding the second event.

12. The system of claim 11, further comprising instructions that, when executed by the at least one processor, cause the system to transmit the compound discovery status update notification by determining that the first event satisfies the set of client-selected compound discovery prerequisite events of the second event, publishing a prerequisite satisfied event, and in response, causing one or more computing devices to initiate a compound discovery task corresponding to the second event.

13. The system of claim 12, further comprising instructions that, when executed by the at least one processor, cause the system to upon determining that the first event satisfies the set of client-selected compound discovery prerequisite events of the second event, publish a fulfillment initiation event to the compound discovery event publication repository, the fulfillment initiation event comprising the second event identifier corresponding to a pre-fulfillment event.

14. The system of claim 13, further comprising instructions that, when executed by the at least one processor, cause the system to upon detecting a completion corresponding to the fulfillment initiation event, publish a fulfillment completion event to the compound discovery event publication repository, the fulfillment completion event comprising the second event identifier corresponding to the pre-fulfillment event.

15. The system of claim 11, further comprising instructions that, when executed by the at least one processor, cause the system to:
    provide, for display via the second computing device, an event configuration user interface; and
    receive the set of client-selected compound discovery prerequisite events and the second client-selected event title based on a user interaction with the event configuration user interface.

16. The system of claim 11, further comprising instructions that, when executed by the at least one processor, cause the system to:

publish the first event, the first event comprises a parent fulfillment event comprising a parent identifier corresponding to a plurality of child events comprising the parent identifier and a plurality of child identifiers, wherein to publish the first event the system:
  monitors the compound discovery event publication repository for the plurality of child identifiers and the parent identifier; and
  publishes the parent fulfillment event in response to identifying a plurality of fulfillment completion events comprising the parent identifier and the plurality of child identifiers via the compound discovery event publication repository.

17. A non-transitory computer-readable medium storing instructions that, when executed by at least one processor, cause a computing device to:
  receive, from a first computing device, a first compound discovery event publication transmission for a first event comprising a first client-selected event title and a first event identifier;
  receive, from a second computing device, a second compound discovery event publication transmission for a second event comprising a second client-selected event title, a second event identifier, and a set of client-selected compound discovery prerequisite events;
  publish the first event and the second event to a compound discovery event publication repository;
  monitor the compound discovery event publication repository to extract the first event identifier from the first event and the first event identifier from the set of client-selected compound discovery prerequisite events of the second event; and
  in response to determining, utilizing the first event identifier, that the first event satisfies the set of client-selected compound discovery prerequisite events of the second event, transmit, to one or more computing devices, a compound discovery status update notification regarding the second event.

18. The non-transitory computer-readable medium of claim 17, further comprising instructions that, when executed by the at least one processor, cause the computing device to:
  provide, for display via the second computing device, an event configuration user interface; and
  receive the set of client-selected compound discovery prerequisite events and the second client-selected event title based on a user interaction with the event configuration user interface.

19. The non-transitory computer-readable medium of claim 17, further comprising instructions that, when executed by the at least one processor, cause the computing device to upon determining that the first event satisfies the set of client-selected compound discovery prerequisite events of the second event, publish a prerequisite satisfied event, and in response, causing one or more computing devices to initiate a compound discovery task corresponding to the second event.

20. The non-transitory computer-readable medium of claim 17, further comprising instructions that, when executed by the at least one processor, cause the computing device to in response to receiving a status query from an additional computing device regarding the second event, generate a status response by searching the compound discovery event publication repository utilizing the second event identifier.

* * * * *